(12) United States Patent
Olsson et al.

(10) Patent No.: US 8,203,343 B1
(45) Date of Patent: *Jun. 19, 2012

(54) RECONFIGURABLE PORTABLE LOCATOR EMPLOYING MULTIPLE SENSOR ARRAY HAVING FLEXIBLE NESTED ORTHOGONAL ANTENNAS

(75) Inventors: Mark S. Olsson, La Jolla, CA (US);
Paul G. Stuart, San Diego, CA (US);
David A. Cox, San Diego, CA (US);
Ray Merewether, La Jolla, CA (US);
Dawn E. Shaffer, San Diego, CA (US);
Ryan B. Levin, San Diego, CA (US);
Michael J. Martin, San Diego, CA (US)

(73) Assignee: SeekTech, Inc., San Diego, CA (US)

( * ) Notice: Subject to any disclaimer, the term of this patent is extended or adjusted under 35 U.S.C. 154(b) by 1248 days.

This patent is subject to a terminal disclaimer.

(21) Appl. No.: 11/248,539

(22) Filed: Oct. 12, 2005

(51) Int. Cl.
*G01V 3/11* (2006.01)
*G01V 3/08* (2006.01)

(52) U.S. Cl. ............................ 324/326; 324/67; 324/260

(58) Field of Classification Search .................. 324/326, 324/329, 333–334, 67, 260
See application file for complete search history.

(56) References Cited

U.S. PATENT DOCUMENTS

| | | | |
|---|---|---|---|
| 4,387,340 A | 6/1983 | Peterman | 324/326 |
| 4,520,317 A | 5/1985 | Peterman | 324/326 |
| 4,806,869 A | 2/1989 | Chau et al. | 324/326 |
| 4,812,812 A | 3/1989 | Flowerdew et al. | 340/854 |
| 5,043,666 A | 8/1991 | Tavernetti et al. | 324/326 |
| 5,640,092 A | 6/1997 | Motazed et al. | 324/326 |
| 5,699,048 A | 12/1997 | Galloway | 340/572 |
| 6,005,532 A | 12/1999 | Ng | 343/867 |
| 6,035,951 A | 3/2000 | Mercer et al. | 175/45 |
| 6,281,882 B1 | 8/2001 | Gordon et al. | 345/166 |
| D475,936 S | 6/2003 | Craig et al. | D10/47 |
| 6,819,109 B2 | 11/2004 | Sowers et al. | 324/329 |
| 7,009,399 B2 * | 3/2006 | Olsson et al. | 324/326 |

OTHER PUBLICATIONS

U.S. Appl. No. 12/016,870, filed Jan. 2008, Olsson et al.*

* cited by examiner

*Primary Examiner* — Reena Aurora
(74) *Attorney, Agent, or Firm* — Steven C. Tietsworth

(57) ABSTRACT

A portable locator for detecting a buried object characterized by an electromagnetic (EM) field emission employing three-dimensional (3D) sensor arrays each having three substantially-identical EM field sensors disposed on a flexible annular wall having a radial centroid defining a sensing axis. The flexible annular sensors are retained in substantial concentricity with the corresponding sensing axes disposed in substantial mutual orthogonality. A pair of 3D sensor arrays disposed on a first axis substantially orthogonal to a second axis defied by another pair of EM field sensors each having a sensing axis disposed along the second axis. The locator introduces a user-reconfigurable user interface (UI) employing a "sticky" ratcheting audio UI and a hollow hinge assembly for redisposing the sensor assembly from an operating to a storage disposition.

13 Claims, 14 Drawing Sheets

RECONFIGURABLE PORTABLE LOCATOR EMPLOYING MULTIPLE SENSOR ARRAY HAVING FLEXIBLE NESTED ORTHOGONAL ANTENNAS

CROSS-REFERENCES TO RELATED APPLICATIONS

This application is related by common inventorship and subject matter to the commonly-assigned patent application Ser. No. 10/268,641, published on Apr. 15, 2004 as U.S. Patent Application No. 2004/0070399 A1, now U.S. Pat. No. 7,009,399 granted Mar. 7, 2006, and to the commonly-assigned patent application Ser. No. 10/308,752, published on Apr. 15, 2004 as U.S. Patent Application No. 2004/0070525 A1, now abandoned, which are both entirely incorporated herein by this reference. This application is also related by common inventorship and subject matter to the commonly-assigned patent application Ser. No. 10/956,328 filed on Oct. 1, 2004, the commonly-assigned patent application Ser. No. 11/054,776 filed on Feb. 9, 2005, which was abandoned in favor of U.S. patent application Ser. No. 11/205,267, now U.S. Pat. No. 7,136,765 granted Nov. 14, 2006, the commonly-assigned patent application Ser. No. 11/106,894 filed on Apr. 15, 2005, and the commonly-assigned patent application Ser. Nos. 11/184,658 filed Jul. 19, 2005, now U.S. Pat. No. 7,288,929 granted Oct. 30, 2007, and 11/184,456, filed on Jul. 19, 2005, which are all entirely incorporated herein by this reference.

BACKGROUND OF THE INVENTION

1. Field of the Invention

This invention relates generally to systems for locating and tracing buried objects and more particularly to a walk-over locator apparatus having improved manufacturability and usability.

2. Description of the Related Art

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, CATV cables, sprinkler control wiring, water pipes, sewer pipes, etc., collectively and individually herein denominated "buried objects." As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business.

When locating buried objects before excavation, it is further desirable to determine the approximate depth of the objects. This is generally attempted by measuring the characterizing emission field strength at two locations and analyzing the differences to infer the location of the emission source. However, there are many instances where the land that is to be excavated may be traversed or crisscrossed by several different utilities such as an electrical power cable, a water line, a gas line, a sewer pipe and a communications line. It is highly desirable to be able to determine their paths and their depths all at the same time. Also, many sites are host to a variety of overhead power and related lines, which emit electromagnetic fields that cannot be readily segregated from the emissions of similar buried lines. Some transmitters known in the art can produce several different signals at different frequencies for application to the same underground object or even to different underground objects, but a problem with these systems arises when several pipes are located in the same area and the location of all pipes is desired. Signals transmitted by several pipes can interfere and complicate the detection process.

Over the years, practitioners in the art have proposed numerous refinements to the magnetic field detector intended to facilitate the location of underground objects. For example, Mercer [John E. Mercer, "History of Walkover Locating Technology," *Int'l Constr. & Utility Equip. Expo*, Louisville, Ky., 23-25 Sep. 1997] discusses a number for significant improvements dating from as early as 1933. Similarly, Roberts [Roy T. Roberts, "The History of Metal Detectors," *Western & Eastern Treasures Magazine*, September 1999] describes the locator art from Michael Faraday (1831) through George Hopkins (1881), including the Hopkins ore-finding device employing an orthogonal sensor array (1904) to Harry Fore (1946). More recent proposals include, for example, U.S. Pat. No. 6,005,532 issued to Ng on Dec. 21, 1999, which discloses an orthogonal antenna arrangement and method that may use two or three identical antenna members to form, for example, a three axis orthogonal antenna assembly may be formed by receiving the two orthogonal axis antenna subassembly in the predetermined configuration of the through hole of a third one of the antenna members in a way which positions the axis of the antenna pattern defined by the third antenna member orthogonally with respect to the axes of the antenna patterns defined by the first and second antenna members. Ng's nested printed-circuit board (PCB) supported coil structures appear to be relatively bulky and of too few turns for useful sensitivity in the lower frequency regions. Although Ng's design permits the coils to be made nearly identical, the intersected regions in each coil are not symmetric, which introduces an orientation-specific non-uniform response to the field sensitivity over the operating frequency region. Also, U.S. Pat. No. 5,640,092 issued to Motazed et al. on Jun. 17, 1997, shows a sensor (FIG. 5) comprising a ferrite ball wound with three orthogonal coils. The device disclosed by Motazed et al. appears to be relatively heavy and costly to fabricate and may exhibit a number of complex circuit resonances at high frequencies and a relatively narrow operating frequency region. Ferrite cores also exhibit disadvantageous sensitivity to changes in operating temperature because ferrite permeability varies markedly with operating temperature.

The above-incorporated commonly-assigned patent applications also propose several improvements to the magnetic field measurement and line locating art, including the use of simultaneous measurement of magnetic field vectors in a plurality of independent frequency regions and the introduction of multiple 3D sensor arrays for measuring magnetic field vectors and the introduction of an improved graphical user interface (GUI) for line tracing. But there remains a clearly-felt need in the portable locator art for improved manufacturability. Modern sensor techniques require more sensor precision and sensitivity without concomitant increases in manufacturing costs, for example. Similarly, modern utility line tracing places complex demands on the locator user, who may be obliged to detect one or more buried objects in a crowded or electromagnetically noisy environment. The above-incorporated commonly-assigned patent applications also propose several improvements to assist the user in recursively processing a large amount of information to determine an object location. But there remains a clearly-felt need in the portable locator art for improved usability through more intuitive user interface (UI) designs, for example.

As described herein, the portable locator is generally small enough to be conveniently human-portable and battery-powered. As used herein, the term "battery" generally denominates a direct-current (DC) voltage source containing cells that convert chemical energy to electrical energy, but includes without limitation the usual alkaline, lithium-polymer and nickel-cadmium (NiCad) electrolytic cells, for example, as well as the more exotic power sources such as the solar photovoltaic cell, the hydrogen fuel cell and the methanol fuel cell, and the super capacitor and flywheel energy stores, for example.

Other practitioners have also proposed usability improvements. For example, U.S. Pat. No. 6,819,109 issued to Sowers et al. on Nov. 16, 2004 and assigned to Schonstedt Instrument Company, discloses a wand-type magnetic metal detector having a telescoping wand that may be shortened sufficiently to permit the detector to be comfortably carried in a holster fastened on a user's body, thereby freeing the user's hands for tasks other than carrying the detector.

Locator usability is important for effective location of buried objects. Effective detection and tracing of utility lines is vital to the safety of field personnel for many reasons; for example, the unplanned rupture of a high-pressure natural gas line can endanger the lives of everybody in the vicinity. Such a system must provide for the simultaneous detection and identification of either a passively-emitting buried object such as a ferromagnetic mass or an energized power cable or an actively-energized buried object such as a conductive pipe energized by means of an external transmitter signal or a non-conductive conduit occupied by an energized sonde, or all simultaneously, for example.

Another well-known problem with portable locator usability well-known in the art is the problem of the "quality" of a location indication. Low signal strength, nearby ferromagnetic objects and interfering EM fields are known to distort the EM field used by the locator to detect and locate the buried object sought by the user, who is then obliged to tease out the causes of signal fluctuations and ambiguities by experimenting with the operation of the portable locator. This usability problem may result in false positives and other errors (e.g., errors in depth measurement) in locating underground utility lines, for example. Such errors may result in unnecessary loss of user efficiency and safety.

Although practitioners in the art have long known about the usefulness of a pair of side-by-side sensing coils for measuring the local magnetic field gradient, (e.g., see U.S. Patent Nos. 4,387,340, 4,520,317, 5,043,666 and D475,936), until now, the combination of a redundant horizontal magnetic gradiometer with a pair of 3D B-field sensor arrays was unknown in the art. Moreover, the utility of such a combination is apparently counterintuitive in the art because (a) the improved usability of measuring the horizontal B-field gradient separately from the two displaced 3D B-field vectors was unknown in the art until now; (b) the additional sensor channels necessary for adding a separate horizontal gradiometer significantly increase locator system cost with no apparent performance advantages; and (c) locating additional sensor coils near the existing locator sensor arrays introduces mutual inductance couplings that are known to reduce the accuracy of the locator system.

These unresolved problems and deficiencies are clearly felt in the art and are solved by this invention in the manner described below.

SUMMARY OF THE INVENTION

This invention addresses the above unresolved problems by introducing for the first time a locator with a number of substantially identical sensor components to provide an orthogonal three-dimensional (3D) sensor array having a common sensor centroid that senses the three orthogonal emission field components at a single point using individual sensors that provide closely matched amplitude and frequency sensitivity over a 500 kHz frequency band, thereby improving locator accuracy. The identical flexible nested sensors of this invention are unexpectedly useful for improved manufacturability because only one set of component designs is required for the three individual sensors in a 3D sensor array of this invention. This invention also addresses the above unresolved problems by introducing for the first time a locator with multiple sensor redundancy in combination with improved measurement of the horizontal magnetic field asymmetry and improved user interface (UI) integration. This invention arises in part from the unexpectedly advantageous observation that two additional horizontally-spaced one-dimensional (1D) sensors may be simultaneously operated to produce reliable horizontal field asymmetry measurements without materially disturbing the 3D field vector measurements provided by two vertically-spaced 3D sensor arrays. Such horizontal field asymmetries are unexpectedly useful primarily because the locator user may use them to reorient the locator assembly azimuthally with respect to the buried utility line and thereby optimize the signal-to-noise ratio (SNR) for field vector measurements from the 1D sensor array to provide a left-right directional indication therefrom after the user orients the 1D sensor axis orthogonal to the buried utility line axis responsive to 3D array signals. This invention also addresses the above unresolved problems by introducing for the first time a locator with a user-configurable UI that provides software and UI elements that allow the user to specify the complexity and sophistication of the UI, thereby improving usability of the invention for a wide spectrum of users, from novice to one highly practiced in the art of location. This invention arises in part from the unexpectedly advantageous observation that a single multipurpose UI may include additional commands and controls for adding and removing command menu components and buried object location indicators under user control without affecting locator performance or accuracy.

It is a purpose of this invention to provide improved manufacturability through the introduction of a flexible sensor for use in the 3D sensor array of this invention with improved sensor accuracy and uniformity. It is a feature of this invention that the 3D sensor array employs three substantially-identical electromagnetic (EM) field sensors disposed in substantial concentricity such that the corresponding sensing axes are disposed in substantial mutual orthogonality.

It is another purpose of this invention to provide improved usability through independent magnetic field measurements sufficient for obtaining accurate buried object location indicators without undue experimentation and retrial by the user. It is a feature of this invention that, for optimal horizontal field asymmetry measurements, the two independent horizontally-spaced 1D sensors may be oriented orthogonally to a buried utility line by the user, thereby producing location indicators of unprecedented accuracy from the 3D sensor arrays.

It is yet another purpose of this invention to provide improved usability through the introduction of a user-configurable UI that permits a user to reconfigure the locator UI to a level of complexity no more than appropriate for the locator task at hand. It is a feature of this invention that the UI includes controls for adding and removing menu items and operating frequency bands under user control.

In one aspect, the invention is a human-portable locator apparatus for locating a buried object characterized by an EM field emission, including a housing with a compartment for holding a battery; a handle coupled to the housing for lifting and carrying the locator apparatus; a sensor assembly coupled to the housing including a sensor array, including three substantially-identical EM field sensors each having at least one conductive coil coupled between two terminals and having an outer side and an inner side disposed on a flexible annular wall having a radial centroid defining a sensing axis, a substantially identical longitudinal height dimension, a substantially identical radial thickness dimension, and a substantially identical circumference dimension; and a structure for supporting the three substantially-identical EM field sensors such that the corresponding sensing axes are disposed in substantial mutual orthogonality and the corresponding conductive coils are disposed in substantial concentricity; and a circuit coupled to the sensor assembly and powered by the battery for detecting and reporting the EM field emission.

In another aspect, the invention is a human-portable locator apparatus for locating a buried object characterized by an EM field emission, including a housing with a compartment for holding a battery; a handle coupled to the housing for lifting and carrying the locator apparatus; a sensor assembly coupled to the housing, including a pair of spaced-apart sensor arrays disposed on a first axis, each sensor array including a plurality of EM field sensors each having a sensing axis, the EM field sensors being disposed such that the corresponding sensing axes are disposed in substantial mutual orthogonality, wherein at least one sensor array includes three EM field sensors; a pair of spaced-apart EM field sensors disposed a second axis, each having a sensing axis aligned substantially with the second axis, and a structure coupled to the housing for supporting the spaced-apart EM field sensor pair and the spaced-apart sensor array pair such that the first and second axes are disposed in substantial mutual orthogonality; and a circuit coupled to the sensor assembly and powered by the battery for detecting and reporting the EM field emission.

In yet another aspect, the invention is a human-portable locator apparatus for locating a buried object characterized by an EM field emission, including a housing with a compartment for holding a battery; a handle coupled to the housing for lifting and carrying the locator apparatus; an elongated sensor assembly including an upper elongated sensor assembly portion coupled to the housing at a proximal end and having a distal end, a lower elongated sensor assembly portion having a proximal end and a distal end, and a hollow hinge assembly disposed to couple the upper elongated sensor assembly portion to the lower elongated sensor assembly portion, including a pair of substantially identical left outer elements, a pair of substantially identical right outer elements each moveably-engaged with a respective one of the left outer elements to form two substantially identical moveably-engaged outer element pairs, and a pair of substantially identical inner elements each moveably-engaged with the other to form a moveably-engaged inner element pair having two sides, wherein each of the two moveably-engaged outer element pairs is affixed to a respective side of the moveably-engaged inner element pair to form a moveably-coupled pair of substantially identical hollow leaves, and wherein one moveably-coupled hollow leaf is affixed to the distal end of the upper elongated sensor assembly portion and the other moveably-coupled hollow leaf is affixed to the proximal end of the upper elongated sensor assembly portion to provide a conduit through which a signal cable passes from the lower elongated sensor assembly portion to the upper elongated sensor assembly portion, and a circuit coupled to the sensor assembly by the signal cable and powered by the battery for detecting and reporting the EM field emission.

In another aspect, the invention is a human-portable locator apparatus for locating a buried object characterized by an EM field emission, including a housing including a compartment for holding a battery; a handle coupled to the housing for lifting and carrying the locator apparatus; an elongated sensor assembly coupled to the housing; a circuit coupled to the sensor assembly and powered by the battery for detecting and reporting indicators of the EM field emission within one or more frequency bands; and a UI including a reconfigurable graphical UI (GUI) including a user input device (UID) for accepting user commands, and a display for displaying GUI menus including user-selectable menu items related to the processing and reporting of buried object location indicators, and a menu processor coupled to the reconfigurable GUI for accepting user commands from the UID and for reconfiguring the GUI menus responsive to user commands.

In still another aspect, the invention is a human-portable locator apparatus for locating a buried object characterized by an EM field emission, including a housing with a compartment for holding a battery; a handle coupled to the housing for lifting and carrying the locator apparatus; an elongated sensor assembly coupled to the housing; a circuit coupled to the sensor assembly and powered by the battery for detecting and reporting indicators of the EM field emission within one or more frequency bands; and a UI including an acoustic UI (AUI) for generating an acoustic signal audible to a user and having an acoustic signal frequency that varies between two predetermined acoustic frequency limits according to the value of a predetermined buried object location indicator until discontinuously stepping to the opposite acoustic frequency limit upon encountering one of the acoustic frequency limits.

In yet another aspect, the invention is a human-portable locator apparatus for locating a buried object characterized by an EM field emission, including a housing including a compartment for holding a battery; a handle coupled to the housing for lifting and carrying the locator apparatus; a sensor assembly coupled to the housing; a circuit coupled to the sensor assembly and powered by the battery for detecting and reporting the EM field emission; a UI; a video sensor for producing a stream of video data representing an image; a video data processor coupled to the video sensor for producing a motion vector (MV) signal representing an apparent motion of the image; and a processor coupled to the circuit for accepting the MV signal, for producing user-selectable indicators of a buried object location, and for adjusting at least one of the buried object location indicators responsive to the MV signal.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE EMBODIMENTS

The Elongated Sensor Assembly

Figure 1:
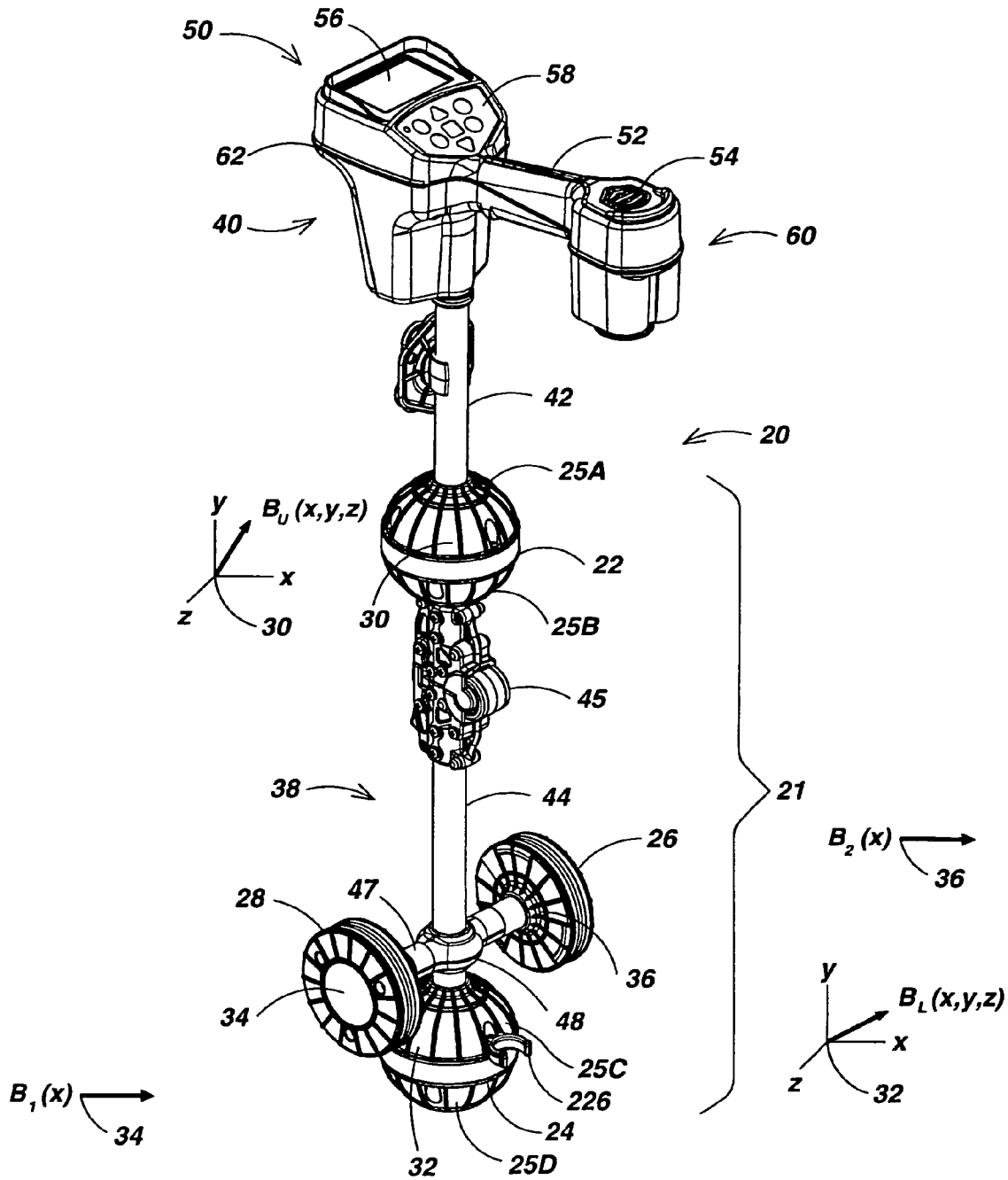
FIG. 1 is a perspective view illustrating an exemplary embodiment of the locator system of this invention shown in an operational disposition.

FIG. 1 is a perspective view illustrating a preferred embodiment 20 of the locator system of this invention shown in an operational configuration. Locator system 20 includes an elongated sensor assembly 21 having a first pair of electromagnetic (EM) sensor arrays 22 and 24 that are vertically spaced-apart and a second pair of EM sensors 26 and 28 that are horizontally spaced-apart and disposed to form a horizontal gradient sensor pair between sensor arrays 22 and 24 during operation. Upper and lower sensor arrays 22 and 24 each are enclosed within generally hemispherical top and bottom molded plastic shells in a watertight manner. Upper sensor array 22 is enclosed by a top shell 25A and a bottom shell 25B and lower sensor array 22 is enclosed by a top shell 25C and a bottom shell 25D. The seam between top shell 25A and bottom shell 25B is sealed with two layers of tape (not shown), which preferably includes application of a narrow inner taped layer of several wraps followed by a wider outer tape layer that also serves as a label. Reflective labeling tape is preferred for the outer tape layer, to optimize instrument visibility in the field.

Sensor arrays 22 and 24 each preferably include three concentric EM field sensor elements (see FIGS. 3-5) each having a sensor axis disposed in a mutually orthogonal arrangement that facilitates the detection of the three-dimensional (3D) EM field vector $B_U(x, y, z)$ at the upper array centroid 30 and the 3D EM field vector $B_L(x, y, z)$ at the lower array centroid 32. The concentric and orthogonal EM field sensor elements of sensor arrays 22 and 24 (not visible in FIGS. 1-2) are described below in detail in connection with FIGS. 3-5. EM sensors 26 and 28 each preferably include at least one EM field sensor element (not visible) having a sensor axis disposed to facilitate the detection of the horizontal EM field component $B_1(x)$ at the left sensor centroid 34 and the horizontal EM field component $B_2(x)$ at the right sensor centroid 36, thereby forming a horizontal gradient sensor pair for measuring the horizontal (x-axis) magnetic gradient. This gradient information, while redundant to the 3D magnetic field information available from sensor arrays 22 and 24, is unexpectedly advantageous for improved usability because it permits the user to align locator system 20 with the local horizontal gradient to obtain improved buried object location data from the 3D sensor inputs, as is described below in connection with FIGS. 9A-B. EM sensors 26-28 include a single EM field sensor (not shown) housed in a pair of mating injection-molded "hockey puck" shells sealed against moisture with tape, substantially as shown.

The spatial relationships among vertically-spaced sensor arrays 22-24 and horizontally-spaced sensors 26-28 are fixed by means of an elongated supporting structure 38, which is also coupled to a housing assembly 40 by means of a member 42 substantially as shown. Supporting structure 38 includes a longer vertical (y-axis) member 44 coupling sensor array 24 to a hollow hinge assembly 45 and a shorter section of vertical (y-axis) section (not visible) of member 42 coupling hollow hinge assembly 45 to sensor array 22. All vertical members exemplified by vertical members 42 and 44 are preferably made from aluminum or fiberglass (GRP) or some other useful non-ferrous hollow tubing to reduce weight and minimize local magnetic fields and field interactions and are fixed to opposed ends of hollow hinge assembly 45, thereby defining a first axis between the centroids 30 and 32 of sensor arrays 22 and 24. Upper and lower sensor arrays 22 and 24 are similar except that the bottom shell 25D is closed in lower sensor array 24, whereas all other shells 25A-C each has a hole through which a vertical member exemplified by vertical member 44 passes. Waterproof seals may be embodied by an O-ring, such as the O-ring 46 (FIG. 3) providing a seal between top shell 25C and vertical member 44.

A horizontal member 47 (also non-ferrous) couples sensor 26 to sensor 28, thereby defining a second axis between their centroids 34 and 36. Members 44 and 47 are joined at a junction 48 such that the respective first and second axes are fixed in a substantially orthogonal relationship, which is preferred. Sensors 26-28 are preferably centered with respect to lower sensor array 24 to minimize signal distortion arising from any mutual inductance coupling the EM field sensors (not visible) in lower sensor array 24 with the EM field sensors (not visible) in sensors 26-28. Sensors 26-28 are also preferably disposed as close to the lower end of locator system 20 (and the buried targets) as possible for increased signal strength and position sensing accuracy without being so close that signal distortion from the resulting mutual inductance overcomes the other signal advantages. Increasing the spacing between sensors 26-28 reduces mutual inductance but also reduces usability by making storage and portability more difficult.

Housing assembly 40 includes a user interface (UI) 50 and a handle 52 disposed to allow the locator user (not shown) to transport, position and control locator system 20. UI 50 is provided to facilitate the transfer of information and commands between the user and locator system 20 and preferably includes an audio UI exemplified by the speaker 54, a graphical UI (GUI) exemplified by a visual display 56 and a user input device (UID) exemplified by a keypad 58, but which may also be embodied as a touch screen or other useful UID. The interior of housing 50 (not visible) includes the audio UI and several other processor, UI and detector elements that are described below in detail in connection with FIGS. 6-10 and elsewhere herein.

Locator system 20 is embodied with what is herein denominated the "SR-20" form factor, which improves manufacturability by requiring fewer unique parts than is commonly believed necessary in the prior art. The "dumbbell-shaped" housing assembly 40 requires only a single element (handle 52) to connect the battery compartment 60 and speaker 54 at the rear with the circuit compartment 62 and sensor assembly 21 at the front. This configuration improves usability and manufacturability and is unexpectedly advantageous over the prior art because it is lighter and more compact, requires fewer unique manufactured components and is sufficiently sturdy to retain structural integrity in the field without additional structural reinforcement. The lighter-weight molded components also lower manufacturing costs. An unexpectedly-advantageous result of the SR-20 form factor is the improved user-handling balance arising from distributing the weight between battery compartment 60 and circuit compartment 62 while also disposing sensor assembly 45 and UI 50 in the forward position that is most usable and desirable when walking forward. The inventors have found it to be advantageous to position sensor assembly 21 as close to the front of handle 52 as otherwise feasible.

Figure 2:
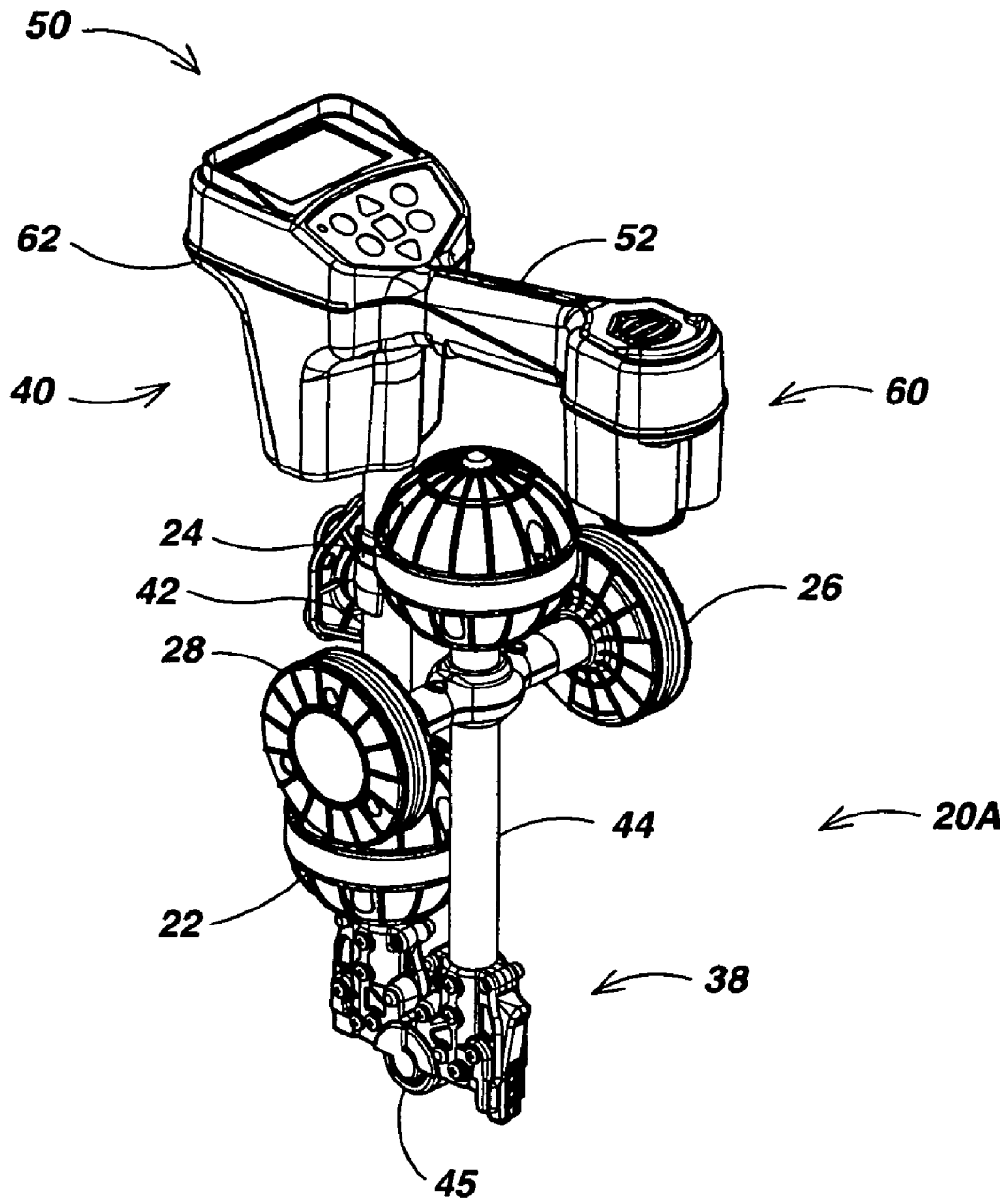
FIG. 2 is a perspective view illustrating the locator system embodiment of FIG. 1 shown in a folded storage disposition.

FIG. 2 is a perspective view showing locator system 20 in a folded transportation and storage configuration 20A facilitated by hollow hinge assembly 45 disposed within supporting structure 38. This folded transportation and storage configuration 20A is essential to the improved usability of locator system 20 and hollow hinge assembly 45 is described below in connection with FIGS. 11-13.

The Nested Flexible Orthogonal Sensor Array

Figure 3:
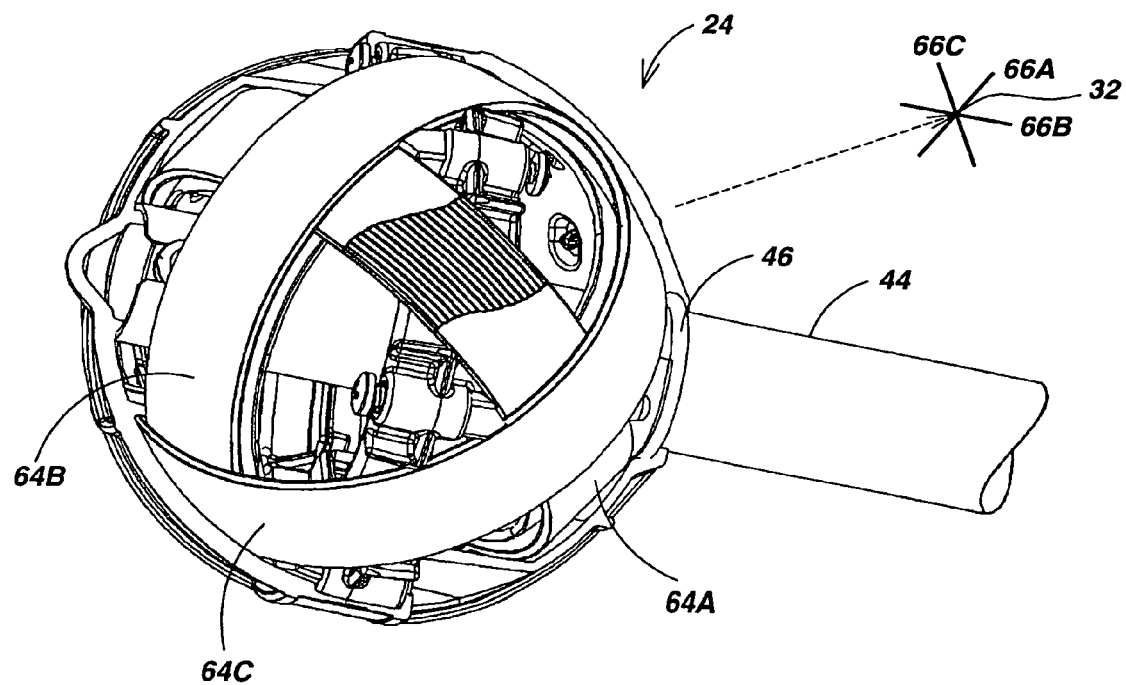
FIG. 3 is an enlarged, breakaway view of the lower three-dimensional (3D) sensor array of this invention from the sensor assembly for the locator system embodiment of FIG. 1.
Figure 4:
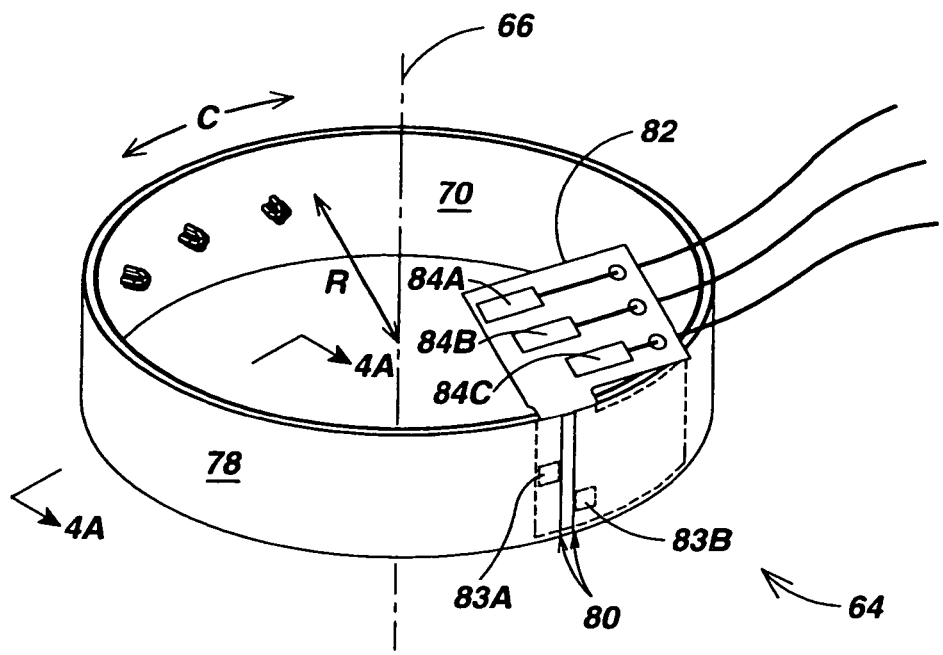
FIG. 4 is a perspective view illustrating an embodiment of the electromagnetic (EM) field sensor of this invention, including the partial cross-sectional view 4A.
Figure 4A:
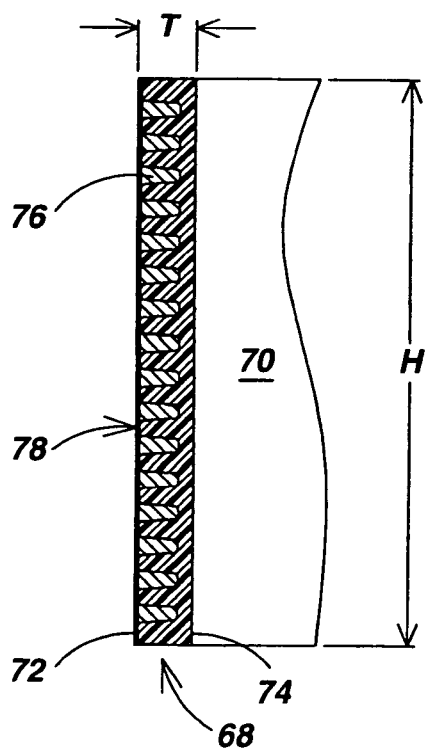

FIG. 3 is an enlarged, breakaway view of lower 3D sensor array 24 from sensor assembly 21 (FIG. 1) from which the internal structure of either of sensor arrays 22-24 may be appreciated. FIG. 4 is a perspective view illustrating an EM field sensor embodiment 64 of this invention having a sensing axis 66 disposed along the radial centroid of the conductive coil 68, which may be better appreciated with reference to the partial cross-sectional view in FIG. 4A, which includes only one side of a complete cross-sectional view. Lower sensor array 24 includes three substantially identical EM field sensors 64A, 64B and 64C each having a corresponding one of the sensor axes 66A-C, each disposed substantially orthogonal to the other two and all passing through lower array centroid 32 (obscured from view in FIG. 3). EM field sensor 64 is formed by wrapping conductive coil 68 around a flexible annular wall embodied as the substantially-circular plastic bobbin or mandrel 70 in FIG. 4A. Conductive coil 68 has an outer side 72 and an inner side 74 and is preferably segmented into physically-separate coils, exemplified by the coil segment 76, to reduce net interwinding capacitance and thereby enhance the useful frequency range of EM field sensor 64. For electrostatic (ES) shielding purposes, EM field sensor 64 is wrapped with a copper shielding tape layer 78 on outer side 72, with the ends 80 of copper shielding tape layer 78 insulated from each other to avoid formation of a shorted turn and a resulting undesirable reduction in the sensitivity.

For any number of wire turns in conductive coil 68, a bobbinless coil wound with self-bonding wire on a removable mandrel offers the thinnest possible radial thickness dimension. The inventors examined several flexible bobbinless coil designs using self-bonding wire and determined that a thin molded, segmented bobbin illustrated in FIG. 4A offers superior response at the higher operating frequencies, better flexibility and better manufacturability.

Each identical EM field sensor 64 must be independently conductively-coupled to the signal conditioning and processing circuits (FIGS. 6-7), which in the prior art may be accomplished by attaching twisted pair wire assemblies directly to each sensor coil. However, this technique presents difficulties associated with the soldered attachment points damaging the fine and delicate wire composing the underlying coil 68. Also, manufacturability is reduced by requiring the handling of numerous fine and delicate wires from the several sensors during assembly, by the waste of the expensive, high-strength flexible wire required for the run through hollow hinge 45 (FIGS. 1-2 and 11-13) resulting from manually trimming to length at each EM sensor 64 and by the necessary customized connectorizing of the cabling between sensor arrays 22 and 24 after assembly of EM sensors 64A-C.

To resolve these well-known problems, the inventors have introduced the flexible printed circuit board (PCB) 82 into EM field sensor 64 for the first time. The two ends (not visible) of conductive coil 68 are soldered to two local pads 83A-B, which are conductively coupled by copper traces to the two PCB pads 84A-B. Copper shielding tape layer 78 is conductively coupled to the PCB pad 84C by copper traces (not shown) that are conductively-coupled by means of conductive adhesive to the inside of copper shielding tape layer 78, which establishes a low cost, reliable and consistent solderless connection between copper shielding tape layer 78 and flexible PCB pad 84C. The ends of the fine wire used for the windings of conductive coil 68 is soldered directly to PCB pads 83A-B, which ensures consistent sensor coil polarity during manufacturing.

As seen in FIG. 4, EM field sensor 64 has a circumference dimension C, an inner annular radius dimension R, a radial thickness dimension T and a longitudinal height dimension H. These dimensions are substantially identical for every EM field sensor included in locator system 20.

Figure 5:
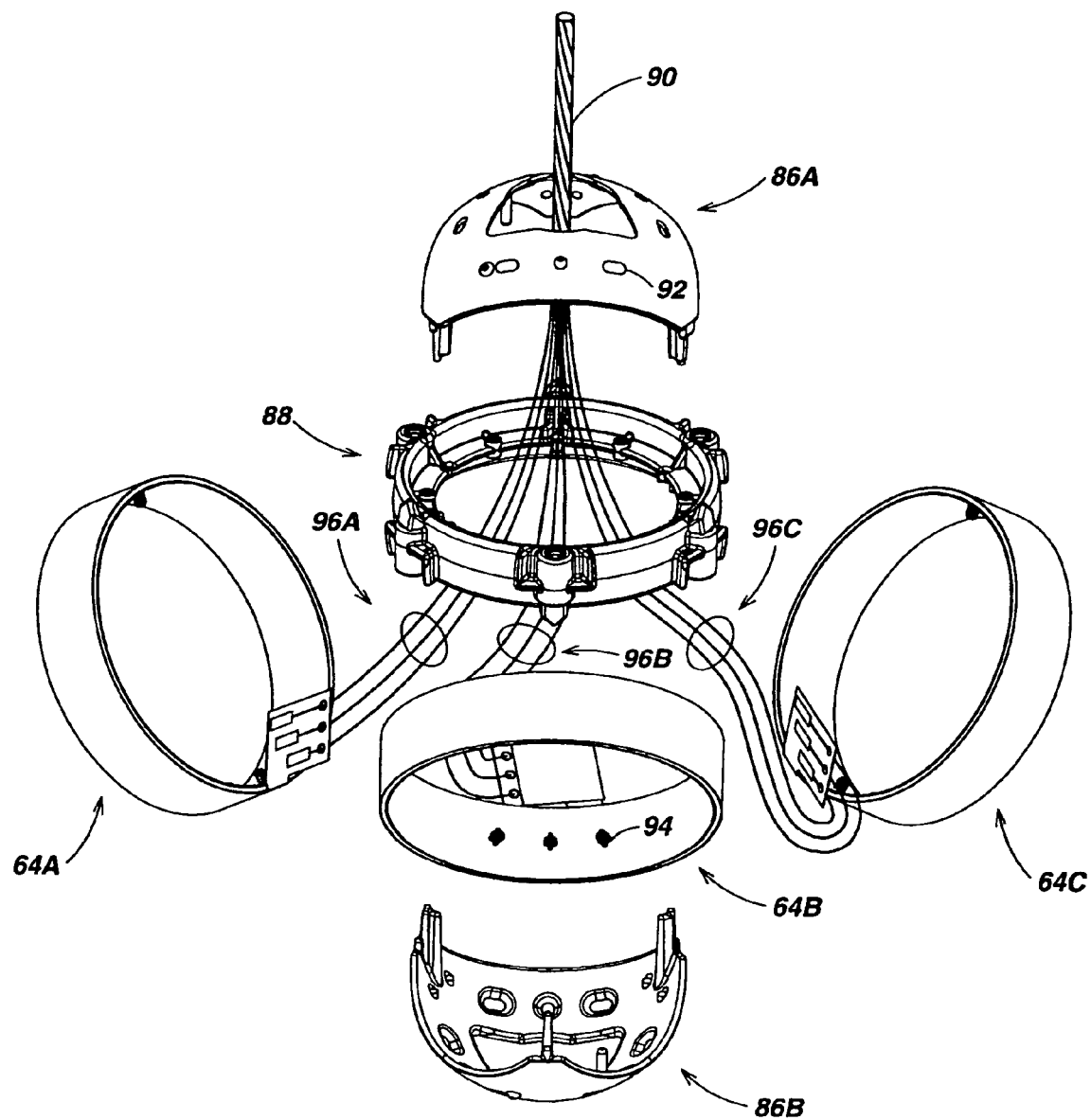
FIG. 5 is an exploded view illustrating the assembly of three substantially identical EM field sensors to form a 3D sensor array of this invention.

FIG. 5 is an exploded view illustrating the assembly of EM field sensors 64A-C to form lower sensor array 24. It is an important feature of this invention that the flexibility of EM field sensor 64 permits assembly of three substantially identical EM field sensors 64A-C in the nested concentric arrangement shown in FIG. 3.

The above-cited commonly-assigned patent application Ser. No. 10/268,641, published on Apr. 15, 2004 as U.S. Patent Application No. 2004/0070399 A1 discloses a sensor array having a set of rigid nested coils having different sizing so that smaller coils may be disposed within the larger ones to produce a 3D orthogonal EM sensor array. Although the individual EM field sensor sensitivity may be adjusted at a predetermined operating frequency by adding turns to the smaller-diameter inner coils, sensor responses differ uncontrollably over the operating frequency region in EM fields that vary significantly across each coil (the important operational case for the 3D sensor). Perhaps even more disadvantageously, the high-frequency resonance characteristic's for the EM field sensor coil vary significantly between coils of differing size and numbers of turns. For example, the inter-winding capacitance varies uncontrollably over frequency with turn number and geometry.

Sensor array 24 of this invention minimizes these sensitivity problems by for the first time employing a plurality of substantially identical EM field sensors 64 that include conductive coil 68 supported on flexible or deformable annular wall 70 so that they can be assembled to nest one inside the other. Although a slight amount of deformation is introduced into coils 64A-C during assembly, the effects of differences from one coil to the others is minimized by constructing coils 64A-C to be relatively narrow in radial thickness (T<<H<<C). When three flexible EM field sensor 64A-C are nested one inside the other, the inner coil 68C tends to be forced into a slightly squared shape and the outer coil 68B tends to assume a slightly elliptical shape. However, the inventors have constructed nested 3D orthogonal sensor arrays according to this invention with a measured sensitivity over the operating frequency region that is identical among the three EM field sensors 64A-C to within one percent.

FIG. 5 illustrates a symmetrical injection-molded plastic support structure of this invention that supports individual EM field sensors 64A-C in a concentric mutually-orthogonal disposition in a manner that improves usability and manufacturability. The supporting structure includes the two identical arched inner shells 86A-B, which are mounted top and bottom onto a hollow support ring 88 to internally support and align EM field sensors 64A-C. A rubber grommet (not shown) is disposed to protect the wire harness cable 90 connecting EM field sensors 64A-C to processing electronics (FIG. 6) in circuit compartment 62. This structure tensions flexible EM field sensors 64A-C internally because it is assembled by snapping hollow support ring 88 into place from the inside of EM field sensors 64A-C before attaching arched inner shells 86A-B. A row of three holes exemplified by the hole 92 in arched inner shell 86A are disposed to accept a mating row of pins exemplified by the pin 94 in EM field sensor 64C. Each EM field sensor 64 includes two rows of three pins (not visible) disposed in diametric opposition on the inside wall of flexible annular wall 70 and each arched inner shell 86 includes three rows of three holes (partially visible), thereby each accepting a row of pins from each of the three EM field sensors 64A-C.

Initially, arched inner shells 86A-B and hollow support ring 88 are collapsed within a smaller volume. Next, EM field sensors 64A-C are installed over the collapsed volume by flexing them as necessary to position them over the corresponding supports on hollow support ring 88. Finally, arched inner shells 86A-B are snapped into position on hollow support ring 88 within EM field sensors 64A-C to lock EM field sensors 64A-C into a concentric and mutually-orthogonal relationship where they are held tensioned by the forces pushing radially outward into the inner sides of the three flexible annular walls 70A-C. This arrangement, in combination with a slight amount of compression added by the installation of outer shells 25C-D (FIG. 1) over 3D sensor array 24, holds all three EM field sensors 64A-C in a secure, locked relationship. Manufacturability is improved by making arched inner shells 86A-B identical.

After assembly of the identical EM field sensors 64A-C, prefabricated, color-coded "fly outs" 96A-C from wire harness cable 90 are connected to each EM field sensor 64 at the corresponding PCB pads 84A-C, after which the corresponding flexible PCB 82 is folded under and secured to the inner side of the respective annular wall 70. The separate three-conductor fly outs 96A-C each connect to a corresponding EM field sensor coil 68A-C and feed to wire harness cable 90, thereby connecting sensor array 24 to the processing electronics (FIG. 6) in circuit compartment 62. This improvement reduces cost, manufacturing errors and improves durability. The ES shields embodied as copper shielding tape layer 78 (FIG. 4) on each EM field sensor 64A-C may alternatively be locally interconnected (to minimize ground impedances) using three short lengths of wire in a star pattern (not shown) and all joined at a single grounding wire (not shown).

Thus, the sensor array of this invention provides an array of substantially identical sensor coils that are substantially orthogonal and also share a common centroid. This is advantageous because the EM sensor output signals represent EM field components at a single point (the common radial centroid) and because the amplitude sensitivity of each sensor is closely matches to that of the others over the operating frequency region from a few Hertz to about 500 kHz and the sensitivity is as high as possible of the coil geometry employed. Also, the resulting light-weight, compact, and durable character of the sensor array of this invention is important for improved usability and manufacturability.

With careful attention to coil construction to make all embodiments of conductive coil 68 physically identical within tight tolerances and with high-tolerance physical and electrical components coupling each conductive coil 68 and the processing circuits (FIGS. 6-7), the inventors have demonstrated a portable locator that requires no adjustment or calibration external to the 3D sensor array, which provides improved manufacturing cost and locator calibration stability in operation. Of course, appropriate software may be provided in the processing electronics to compensate for sensitivity differences among EM field sensors 64A-C, but the absence of any requirement for such provisions improves usability and manufacturability and facilitates more precise calibration.

Individual ES shielding and grounding of each EM field sensor coil 64 is a preferred technique for eliminating most of the EM field sensor response to local electric fields and thereby provide EM field sensor coil signals responsive primarily to local magnetic fields. Alternatively, of course, the entire sensor array enclosure can be shielded by, for example, molding plastic shells 25C-D from a conductively-filled plastic and connecting them to a signal ground or using conductive paint or an electroplated coating on the inside of shells 25C-D. But the individual shielded EM field sensor coil of this invention provides superior performance, is very symmetric and has lower manufacturing costs than any of the approaches known in the art, including shielding the entire sensor array volume.

Sensor Signal Processing

Figure 6:
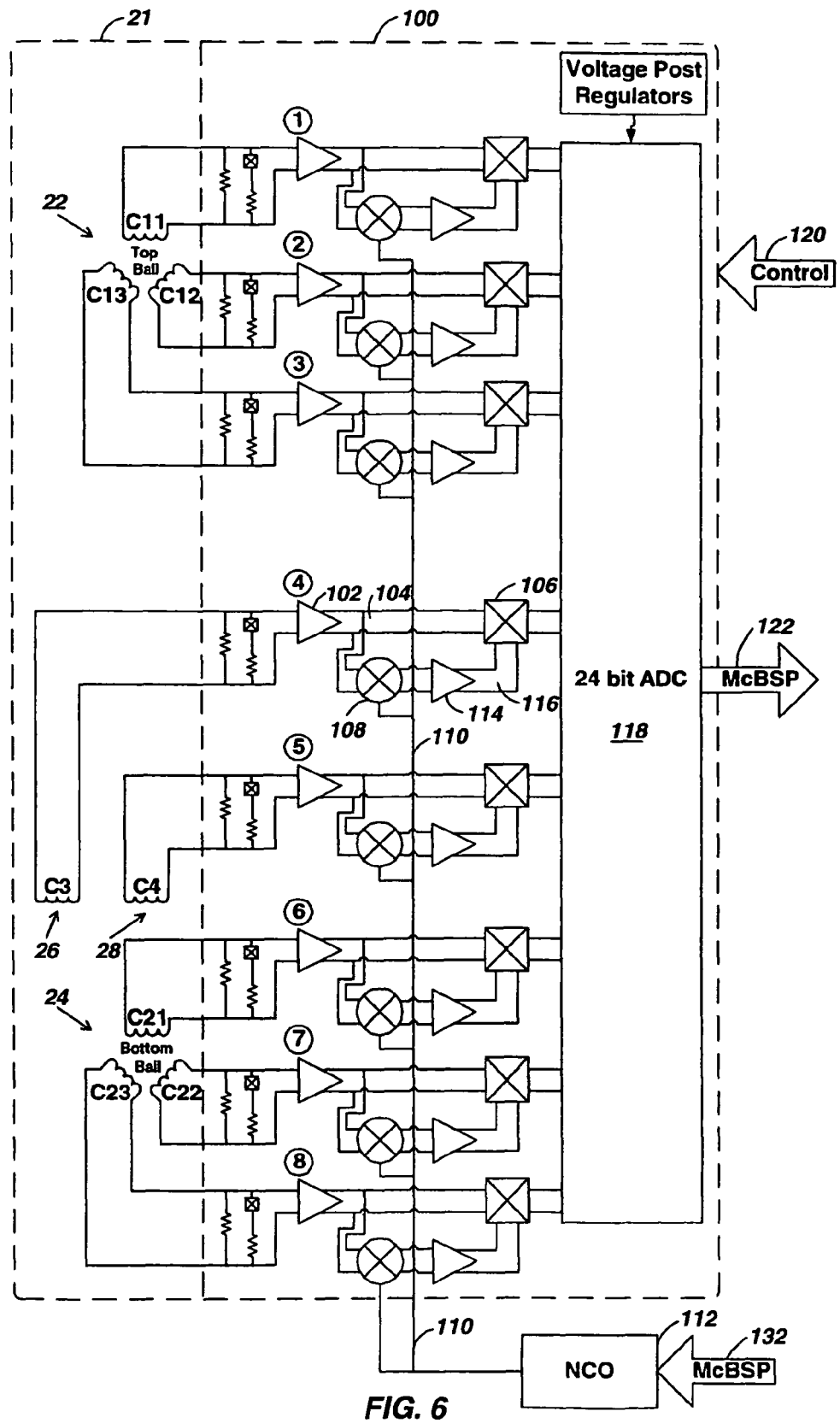
FIG. 6 is a block diagram illustrating an embodiment of the sensor and sensor conditioning assemblies of this invention for the locator system embodiment of FIG. 1.
Figure 7:
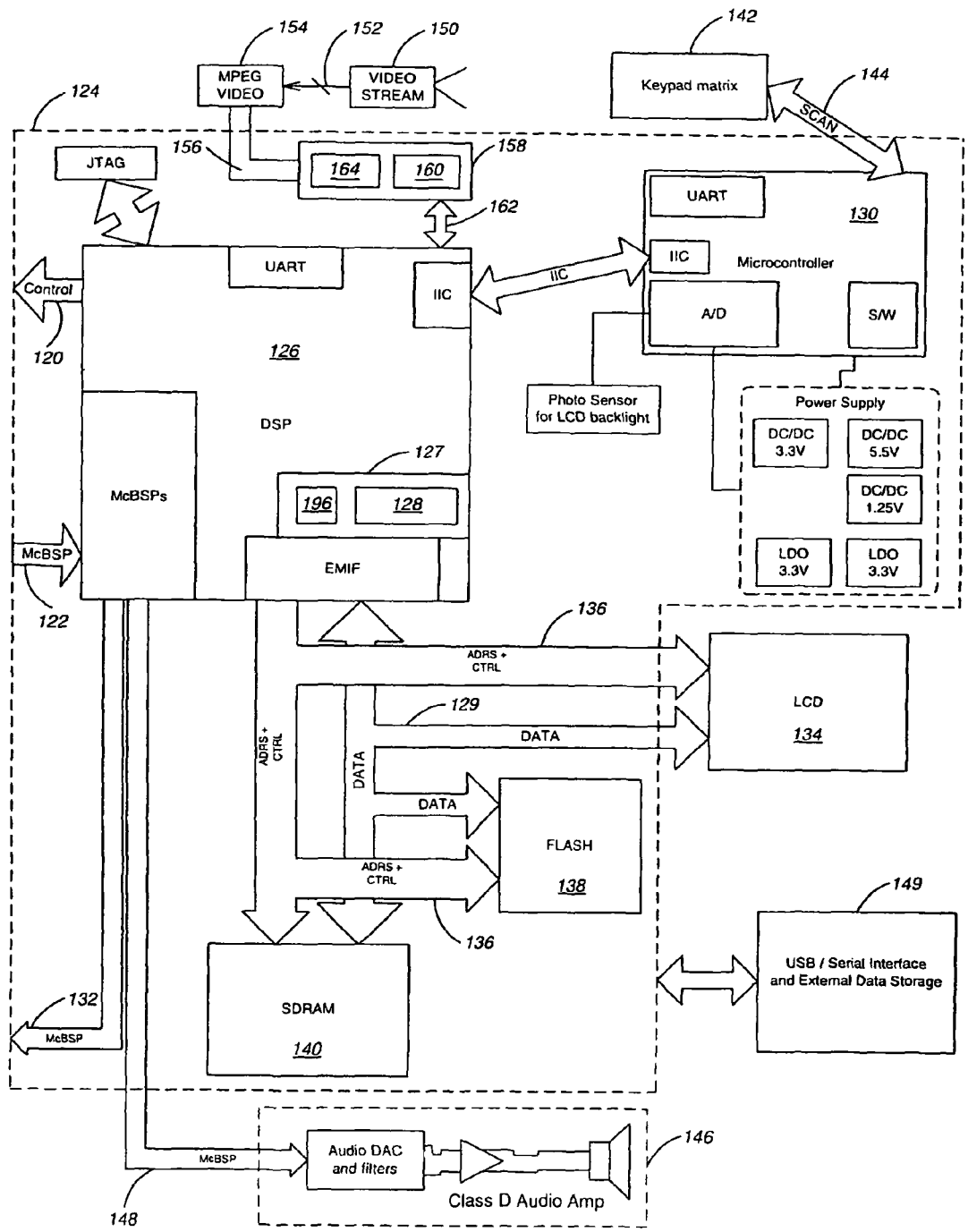
FIG. 7 is a block diagram illustrating an embodiment of the processor and user interface (UI) circuit assemblies of this invention for detecting and reporting EM field emissions in the vicinity of the locator system embodiment of FIG. 1.

FIG. 6 is a block diagram illustrating an embodiment of the sensor conditioning assembly 100 of this invention for locator system 20. Sensor assembly 21 (FIG. 1) includes eight identical EM field sensor coils 64 organized physically to constitute upper 3D sensor arrays 22 with three orthogonal sensor coils ($C_{11}$, $C_{12}$, $C_{13}$), lower 3D sensor array 24 with three orthogonal sensor coils ($C_{21}$, $C_{22}$, $C_{23}$), and horizontal gradient sensors 26 and 28 with two sensor coils ($C_3$) and ($C_4$) having horizontally-aligned sensor axes 34 and 36 (FIG. 1). Each coil is independently coupled to one of eight identical channels in the analog signal conditioning and digitizing assembly 100, which may be appreciated with reference to the following description of the fourth conditioning channel coupled to EM field sensor 26 ($C_3$). Coil $C_3$ is coupled by way of the appropriate frequency-response conditioning and signal attenuating elements to a preamplifier 102, which produces a low-impedance differential analog time-varying signal $S_4(t)$ 104. Signal $S_4(t)$ 104 is routed directly to the switch 106 and also to the mixer 108 where it is mixed with a local oscillator (LO) signal 110 from a numerically-controlled oscillator (NCO) 112 to produce the usual sum and difference frequencies, which may be low-pass filtered in the usual manner to remove the sum frequencies from the difference frequencies at the input of the isolation amplifier 114, for example. Thus, amplifier 114 produces an intermediate frequency (IF) signal 116 representing time-varying signal $S_4(t)$ 104 shifted down in frequency by an amount corresponding to LO signal 110. Switch 106 may be set or reset to present either time-varying signal $S_4(t)$ 104 or IF signal 116 or both to the 24-bit Analog-to-Digital Converter (ADC) assembly 118, which produces a digital data signal representing a sample of the selected analog time-varying signal (either signal 106 or signal 116) in the usual manner. IF signal 116 may be preferred when the user has knowledge of the signal emission sought (active location) and signal 106 may be preferred when the user has no foreknowledge of the signal emission sought (blind passive location), for example. Responsive to the external control signals 120, ADC assembly 118 thereby produces K=8 streams of digital signal samples 122 representing the K=8 time-varying signals $\{S_k(t)\}$ from sensor assembly 21. As described herein, ADC assembly 118 provides a new signal sample for each of K=8 sensor signals for every t seconds, which is herein denominated the sampling interval. For example, the inventors have demonstrated the usefulness of a 73,245 Hz sampling rate, which imposes a sampling interval t=13.65 microseconds FIG. 7 is a block diagram illustrating embodiments of the processor circuit assembly 124 and the user interface (UI) circuit assembly of this invention. Processor assembly 124 accepts digital signal samples 122 from ADC assembly 118 (FIG. 6) at a digital signal processor (DSP) 126, which includes internal memory 127 for storing and executing the accumulator and evaluator software program elements 128 required to produce digital data representing buried object emission field vectors on the data bus 129 in any useful manner described in the above-cited commonly-assigned patent applications fully incorporated herein by reference. For example, software program elements may be provided in DSP 126 to evaluate a B-field vector magnitude for each of the K=8 channels of digital data 122 arriving from analog signal conditioning and digitizing assembly 100. Indications of the three-dimensional (3D) EM field vector $B_U(x, y, z)$ at the upper array centroid 30 (FIG. 1) and indications of the 3D EM field vector $B_L(x, y, z)$ at the lower array centroid 32 may then be provided to the user by means of the UI assembly under control of DSP 126, for example. Additionally, indications of the independently measured horizontal magnetic gradient equal to the difference between the horizontal B-field component $B_1(x)$ at the left sensor centroid 34 and the horizontal B-field component $B_2(x)$ at the right sensor centroid 36 may also be provided to the user by means of the UI assembly under control of DSP 126, for example. Moreover, these B-field vector indications may be limited to certain frequency bands and may be updated with the passage of time to reflect changes in any useful manner described in the above-cited fully-incorporated patent applications, for example.

DSP 126 operates under the control of a microcontroller 130 and also produces external control signals 120 for controlling ADC assembly 118 and the clock control signals 132 for controlling NCO 112 (FIG. 6). The Graphical UI (GUI) liquid-crystal display (LCD) 134 is disposed to accept and display digital data representing buried object emission field vectors from data bus 129 under the control of various program instructions transferred on the address and control bus 136. Data bus 129 and control bus 136 are also coupled to a flash memory 138 and a synchronous dynamic random-access memory (SDRAM) 140, which all operate under the control of DSP 126 and serve to store data for program control and display purposes, for example. The UID 142 is coupled to microcontroller 130 by, for example, a standard matrix scan bus 144, whereby a user may insert commands to processor assembly 124. An Audio UI (AUI) 146 operates to transfer various audio signals to a user from the serial bus 148 under the control of DSP 126 as discussed below in connection with FIGS. 14A-B. Processor assembly 124 may provide a new set of field vectors for every accumulation interval, which is herein defined as a plurality T of the t-second (13.65 μsec) sampling intervals, thereby providing indications as a function of time. This plurality T of the t-second sampling intervals is indexed by the integer i=1, T, where T may vary from one accumulation interval to the next and where sequential accumulation intervals may be either disjoint or overlapping, for example. The t-second (13.65 μsec) sampling interval may also vary. The inventors have demonstrated the usefulness of a T=64 sample buffer interval, for example. An external data interface module 149 is also provided to allow data communication between processor assembly 124 and external devices such as a personal computer or external storage devices such as external removable memory media or a universal serial bus (USB) drive (not shown), for example.

Supplemental Video Motion Estimation

Sensors such as Global Positioning System receivers, accelerometers and gyros are commonly used to provide navigational information to locator systems. In some cases, a combination of these and other devices are used in concert, to "overlay" data, and "tighten the mesh" over the area of interest by having redundant data, which allows greater certainty and resolution as to the position of the instrument within the area of the survey.

By mounting a camera under an instrument used for surveying; or utility location, and having either a range finding system (such as acoustic, radar, or optical/laser), or a mechanical limit (such as a roller on the end of a fixed length pole or a tripod support), such that the distance between the camera and the ground can be known, and having a camera with a fixed or known field of view and focal distance, the camera would produce video with a known viewing area. Thus the size and position of objects in the area can be determined.

As shown in FIG. 7, locator system 20 may alternatively include a video sensor 150 (see FIG. 1) for producing a stream of video data 152 representing an image field of view (FOV). Video data stream 152 may be processed according to any useful standard such as the MPEG-4 protocol to produce and store a compressed video data stream at a video data processor 154 such as may be found in commercial video cameras. MPEG-4 is an International Organization for Standardization/International Electrotechnical Commission (ISO/IEC) standard developed by the Moving Picture Experts Group (MPEG), which is the committee that also developed the standards known as MPEG-1 and MPEG-2. The MPEG-4 protocol, formally denominated ISO/IEC 14496 [ISO/IEC 14496 "Information technology—Coding of audio-visual objects"], was finalized in October 1998 and became an International Standard in the first months of 1999. The fully backward-compatible extensions under the title of MPEG-4 Version 2 were frozen at the end of 1999, to acquire the formal International Standard Status early in 2000.

The above-incorporated commonly-assigned patent applications discuss the usefulness of object recognition and motion tracking for navigation. However, locator system 20 of this invention directly co-opts the MV bit stream data independently generated as part of an industry-standard video compression scheme, such as MPEG-1/2/4, for example, in a separate video chip. This is unexpectedly advantageous because using an existing bit stream avoids the expense and complexity normally expected for providing visual navigation information to the detection processing system for a portable, over-the-ground instrument such as, for example, a locator system exemplified by locator system 20 (FIGS. 1 and 6-7). This MV data can be cost-effectively extracted from an existing MPEG4 (for example) bit stream for use in improved navigation of any portable instrument, such as a locator.

To appreciate the operation of a standard MPEG-4 video compression system, reference is made to Kuhn [Peter Kuhn, "Algorithms, Complexity Analysis and VLSI Architectures For MPEG-4 Motion Estimation," *Kluwer Academic Publishers*, Boston, 1999, Ch. 1-2]. Also, reference is made to Hughes et al. [C. J. Hughes et al., "Standard Codecs: Image Compression to Advanced Video Coding," *IEE Telecommunication Series* 49, *Institute of Electrical Engineers*, London, 2003, Ch. 3, 7 and 10]. As used herein, motion estimation (ME) data denominates a plurality of MVs. There is one MV data stream provided for each MPEG motion-compensated macroblock.

When processing signal 152, video data processor 154 compresses the data by removing redundancy. For example, when using the MPEG-4 standard, data representing macroblocks of pixel values for a picture to be encoded are fed to both a subtractor and the motion estimator (not shown) within video data processor 154. The motion estimator compares each of these new macroblocks with macroblocks in a previously stored reference picture or pictures. It finds the macroblock in the reference picture that most closely matches the new macroblock. The motion estimator then calculates a motion vector (MV) that represents the horizontal and vertical displacement from the macroblock being encoded to the matching macroblock-sized area in the reference picture. The MVs have half-pixel resolution achieved by linear interpolation between adjacent pixels, and each MV represents substantially less data than the macroblock itself.

Thus, a MV signal 156 representing the apparent motion of the image FOV is available for image compression purposes and may also be provided by video data processor 154 to processor circuit assembly 124 for use in improving the usability of locator system 20 by reducing location ambiguities in the manner now described.

The MV motion information together with the distance that video sensor 150 is known to be above the ground, permits the software to determine the direction and velocity that locator system 20 is translating with respect to the ground, which then may improve the navigational certainty of locator system 20 location, independently or in cooperation with data from the other available sensor elements.

A plurality of MV data streams generated for arbitrarily-shaped video objects involving a plurality of macroblocks are particularly advantageous because the applicable alpha-plane "shape" can be used to track and also later recognize various specific objects to index instrument navigation to specific locations tied to the imaged terrain features. MV data streams for multiple objects can be processed to derive the rotation of the portable instrument (such as a locator) with respect to the terrain. The addition of a compass data stream in the portable instrument enables rotation of the MPEG4 alpha-plane shapes MV data into a world coordinate system to facilitate absolute terrain-location matching. Separate determination of the locator height above the ground plane enables scaling of the video image objects for improved terrain-location matching.

The user of locator system 20 cannot change the underlying conditions of a difficult location, but by changing frequency, grounding conditions, transmitter location or by isolating the target line from a common ground, the user can improve the location results; for example, by making a better ground connection, avoiding signal splits, or reducing local B-field distortion. Adding image MV information in processor circuit assembly 124 reduces ambiguities and improved the quality of the location indicators presented to the user. MV signal 156 is accepted at the MV processor 158, which includes memory for storing, for example, the software 160 for accepting user-selectable indicators of a buried object location on the bus 162 and the software 164 for adjusting a buried object location indicator responsive to MV signal 156.

In certain circumstances, such as where the instrument is used over a "moving scene" such as over flowing water, or perhaps turbulent dust, the MVs produced may contain additional motion of the scene, and thus an error term that must be detected by a secondary navigational sensor or noted by an alert user.

If an optical reference such as a circle projected by a holographic laser filter is laid over an area of interest, additional software and MV processor 158 should be able to determine the flatness of the ground surface, or provide indicators of surface features, by comparing the perceived motion of the reference array within the FOV. This feature may be used to, for example, examine the walls of a well or pipe by suspending the video sensor 150 element of locator system 20 in the well, or by moving it along within a pipe where other features of interest (such as defects in the pipe) should be identifiable form the MV features within the FOV.

The Reconfigurable User Interface

Figure 8:
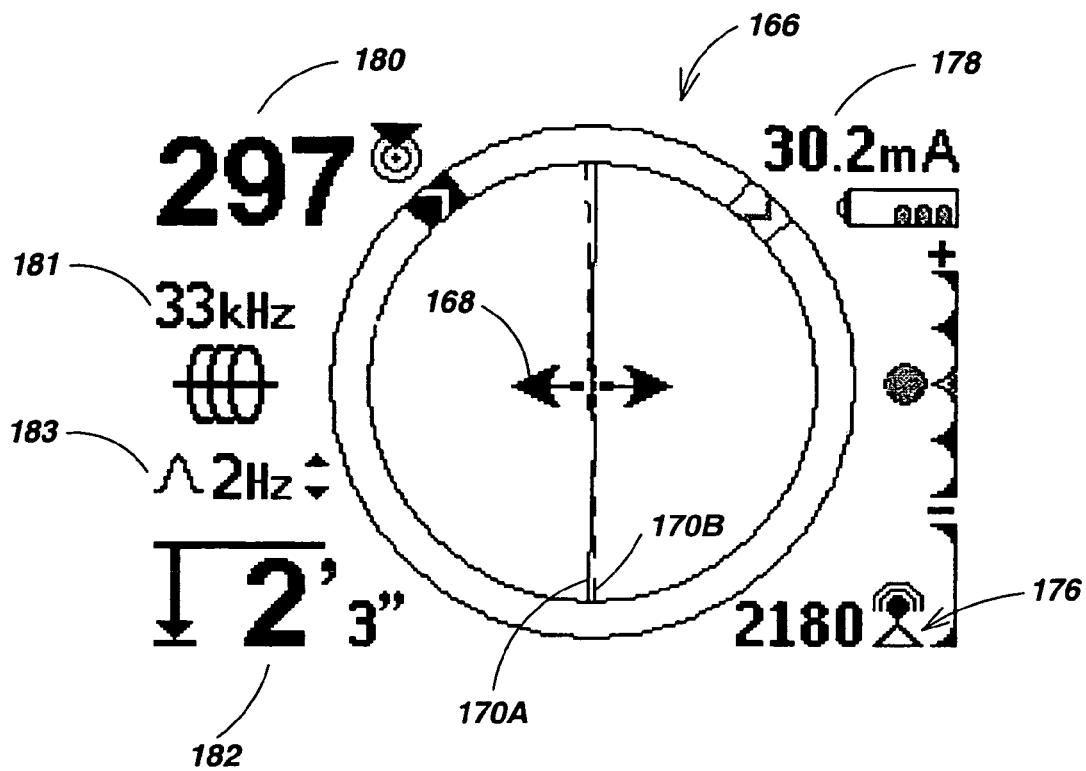
FIG. 8 is a schematic diagram illustrating an exemplary embodiment of the graphical UI (GUI) element of the locator system of this invention.

FIG. 8 is a schematic diagram illustrating an exemplary embodiment 166 of the GUI display element of this invention. The inventors for the first time have recognized that an independent horizontal B-field gradient measurement unexpectedly improves usability and user efficiency by reducing the user confusion arising from the well-known effects of local B-field distortion on 3D sensor array operation. This improved usability is preferably implemented in locator system 20 as an improved GUI display 166 (FIG. 8) that provides to the user a guidance arrow indicator 168 representing the redundant horizontal gradient data from sensors 26 and 28. Indicator 168 is displayed independently from the upper and lower trace direction line indicators 170A-B derived from the B-field vector data from upper and lower sensor arrays 22-24. Examination of the three independent user-selectable GUI indicators 168 and 170A-B allows the user to quickly identify the presence of local B-field distortions.

Figure 9A:
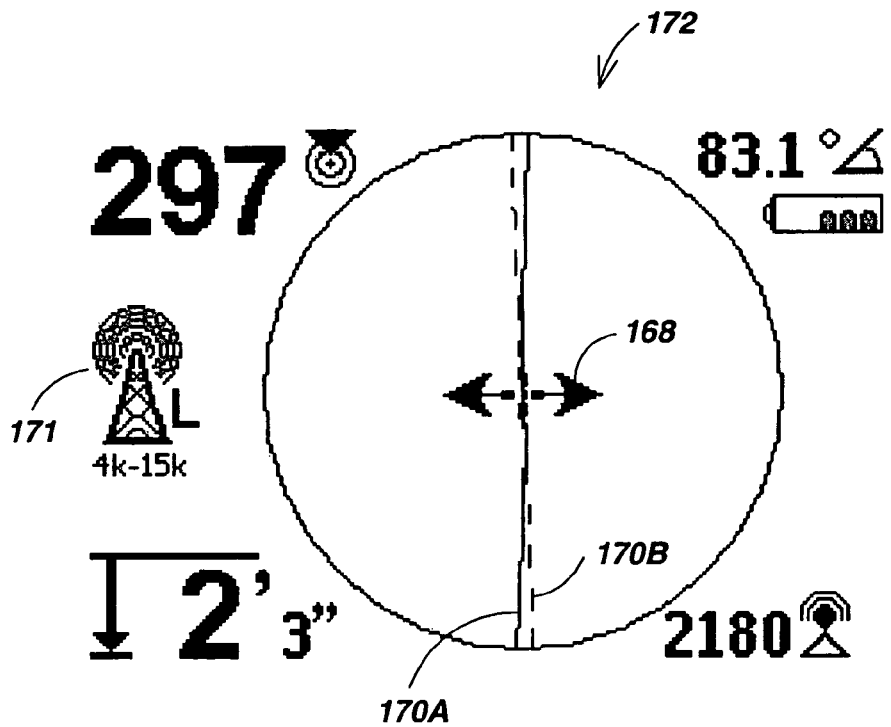
FIGS. 9A-B are schematic diagrams illustrating other exemplary embodiments of the GUI element of the locator system of this invention.
Figure 9B:
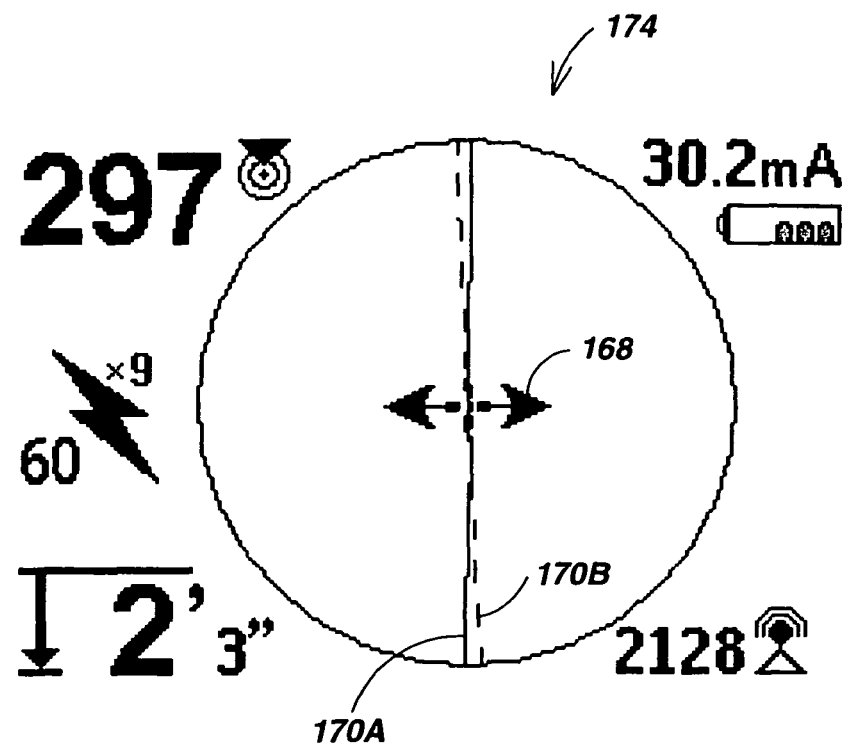

FIGS. 9A-B are schematic diagrams illustrating other exemplary embodiments 172-174 of the GUI display element of this invention showing another embodiment of indicators 168 and 170A-B. In operation, the properly trained and experienced user learns to "see" the ground situation by evaluating the several available user-selected buried object detection indicators exemplified by indicators 168 and 170A-B. A simple detection and location of a straightforward circular (undistorted) B-field is fast and easy even without the improvements of this invention. But tracing a buried line that passes close to other large buried conductors such as power lines, phone lines, gas mains or buried scrap metal involves significant critical thinking to evaluate the effects of the resulting B-field distortions and interferences. The resulting ambiguities can be resolved only by properly evaluating all of the available location indicators, including the independent redundant indicators of this invention.

For example, when guidance arrow indicator 168 remains centered and stationary while either upper or lower trace direction line indicator 170A-B is displaced over to one side (FIG. 8 shows a mild example of this configuration), the user can clearly see evidence of local B-field distortion. This indicator configuration says that the primary B-field emission detected by upper and lower sensor arrays 22-24 is distorted by local secondary B-fields unrelated to the buried object characterized by the primary emission because these detections are not consistent with the horizontal B-field gradient independently detected by sensors 26 and 28.

The user examines user-selectable location indicators such as guidance arrow indicator 168, lower trace direction line indicator 170A (solid line), upper trace direction line indicator 170B (broken line), the signal strength indicator 176, the computed current strength or angle indicator 178, the emission proximity indicator 180, the operating frequency band 181 and the virtual depth indicator 182, for example, the user can estimate how the local B-field is being distorted. The user may then compare this B-field information with an educated review of the ground, noting any transformers, meters, junction boxes, manholes and other possible emission source indications to develop an opinion of the nature and cause of the local B-field distortion.

The inventors have discovered that a separate and independent measurement of the B-field gradient is unexpectedly useful because, although the gradient measurement must be aligned with the local B-field to be meaningful, such alignment is a simple matter for the user when there is a separate and independent 3D B-field vector measurement available. The inventors have resolved the problem of mutual inductance coupling between sensors 26-28 and arrays 22-24 by using air-core coil sensor embodiments and by including a software routine to adjust the sensitivity of lower sensor array 24 to the presence of sensors 26-28 at frequencies above 33 kHz. Although the coupling effects extend down to 8 kHz or so, careful disposition of the sensor elements reduces these effects to acceptable levels below 33 kHz.

Figure 10A:
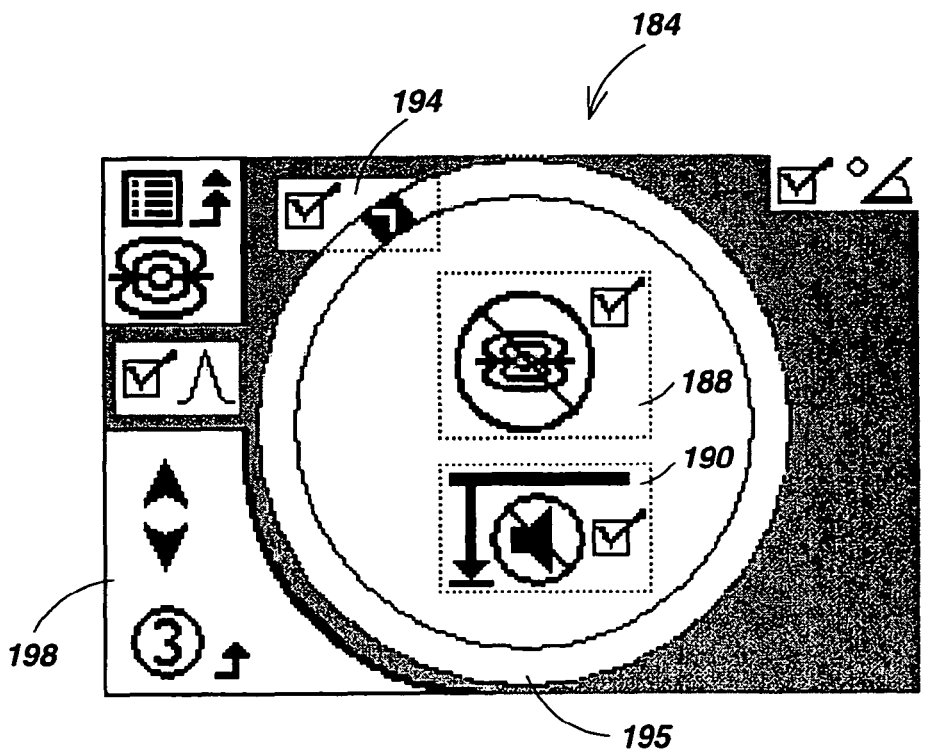
FIGS. 10A-C are schematic diagrams illustrating exemplary embodiments of the reconfigurable GUI element of the locator system of this invention.
Figure 10B:
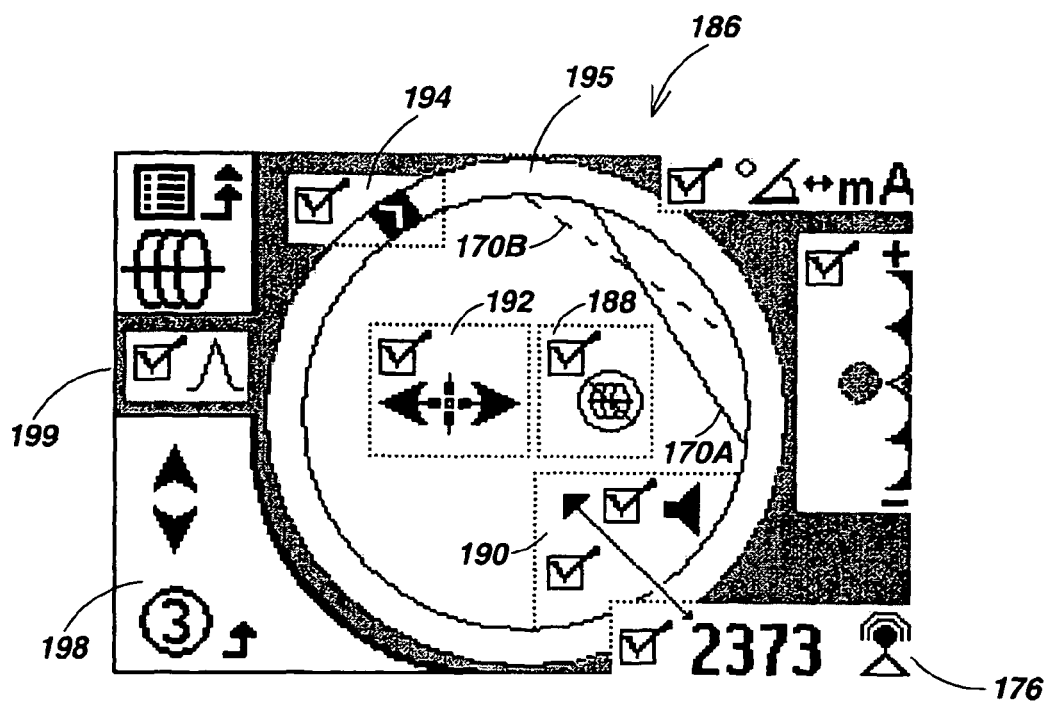

FIG. 10A—are schematic diagrams illustrating exemplary embodiments 184, 186 and 187 of the reconfigurable GUI element of this invention. Reconfigurable GUIs 184-187 operate to improve the usability of locator system 20. There are many different types of locator users. Some users merely need a simple UI and the presence other sophisticated GUI features actually reduce usability by distracting and confusing the user. Other "power" users need all of the most sophisticated GUI features available and usability suffers for them when the feature set is limited. Reconfigurable GUI displays 184-186 provide user-selectable indicators of a buried object location, including Screen Elements and Optional Frequencies.

The user is provided with GUI menu items for adding and removing screen elements and their associated features from the GUI. This is preferably accomplished with a graphical image of the screen display where the user can step from item to item and check it to be displayed or not (select/deselect). Features that are unchecked are "turned off" and not available for use. These screen elements may include certain button functionality that is disabled when the associated feature is deselected. For example, in GUI display 184, several user-selectable menu items are visible, including the item 188 for selecting/deselecting a low signal strength display suppression feature, the item 190 for selecting/deselecting AUI 148 (FIG. 7) and the item 199 for selecting/deselecting signal focus 183 (FIG. 8). Similarly, in GUI 186, the item 192 activates horizontal gradiometer functionality and displays guidance arrow indicator 168 (FIG. 8) and the item 194 activates an icon that moves within the annulus 195 to visually communicate changes in buried object location indicators. Any of the available buried object location indicators may be included in the reconfiguration menus. The reconfiguration is accomplished by a menu software process 196 (FIG. 7), for example, which includes software for accepting user commands from UID 142 and software for effecting the requested reconfiguration of stored GUI menus.

Figure 10C:
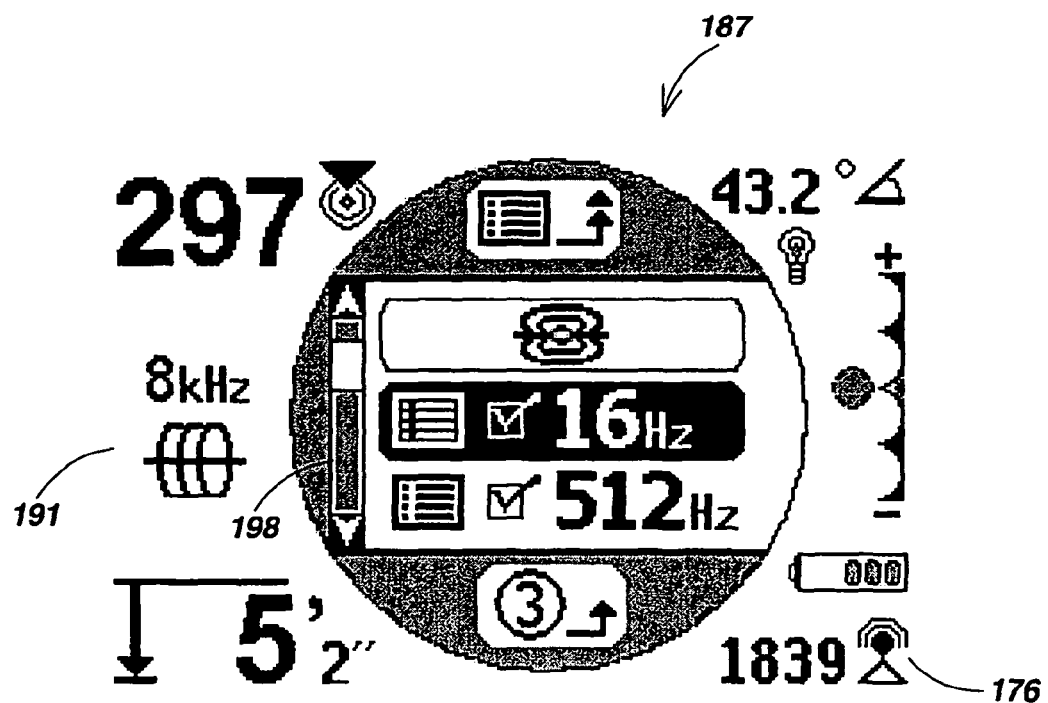

In FIG. 10C, reconfigurable GUI 187 facilitates the selection of a subset operating frequency bands. Locator system 20 provides the user with many different operating frequency bands. Reconfigurable GUI 187 provides an underlying list of operating frequency bands from which a desired sub-list of frequency bands can be selected to appear in the main GUI menu (or not), by means of a scrolling icon 198, for example. After selection of this sub-list by the user, the GUI interface remains limited to only the few or many frequency bands desired, from which sub-list the user may later activate one or more frequency bands (e.g., the frequency band 191 or frequency band 181 in FIG. 8) for operation in the usual manner.

The Hollow Hinge Assembly

Figure 11A:
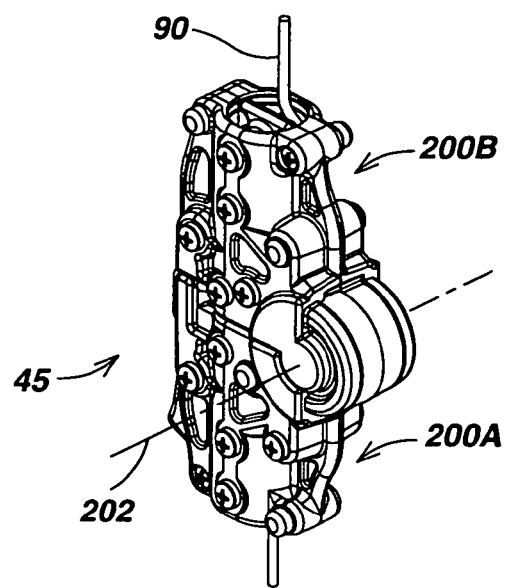
FIGS. 11A-B are perspective open and closed views of an exemplary embodiment of the hollow hinge assembly of this invention for the locator embodiment of FIG. 1.
Figure 11B:
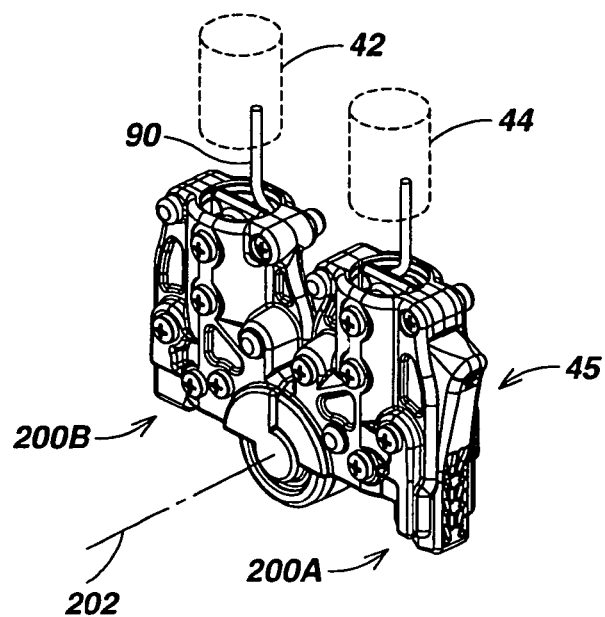

FIGS. 11A-B are perspective open and closed views of an exemplary embodiment of hollow hinge assembly 45 of this invention from locator system 20 of FIG. 1. FIG. 11A shows hollow hinge assembly 45 in a fully open position with the upper and lower moveably-coupled hollow leaves 200A-B each of which is free to rotate about the hinge axis 202 from the fully open position shown in FIG. 11A to the fully closed position shown in FIG. 11B. The inventors have introduced hollow hinge assembly 45 into locator system 20 to provide, for the first time, several unexpected advantages. Hollow hinge assembly 45 improves the manufacturability and usability of locator system 20 because it requires fewer unique plastic parts and provides for a convenient and compact locator system storage configuration through which wire harness cable 90 passes freely with protection from external moisture and the elements. Each end of hinge assembly 45 attaches to the adjoining tubing sections 42-44 (FIG. 11B) and uses identical molded parts. After extension to the open position (extending sensor assembly 21 as shown in FIGS. 1 and 11A), the tube sections 42-44 share a common axis. Soft rubber and grease wire seals (not shown) are employed on either side of hollow joint assembly 45 so that sealing the joint against water intrusion is not needed.

Figure 12A:
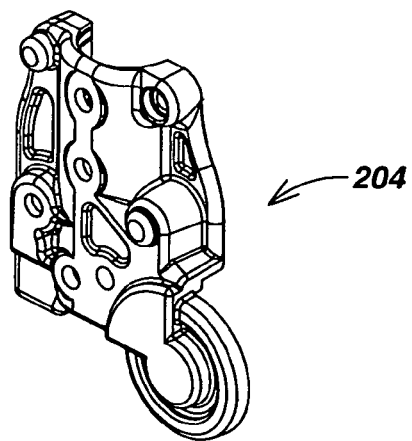
FIGS. 12A-C are perspective views of the two unique outer and one unique inner elements of the hollow hinge assembly of FIG. 11.
Figure 12B:
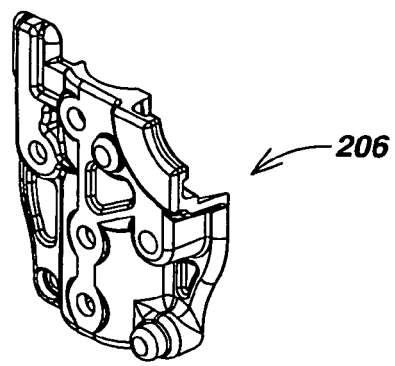
Figure 12C:
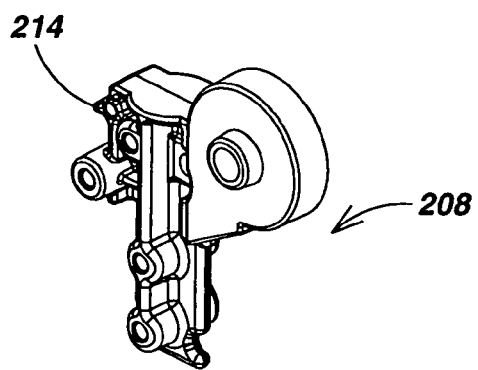
Figure 13:
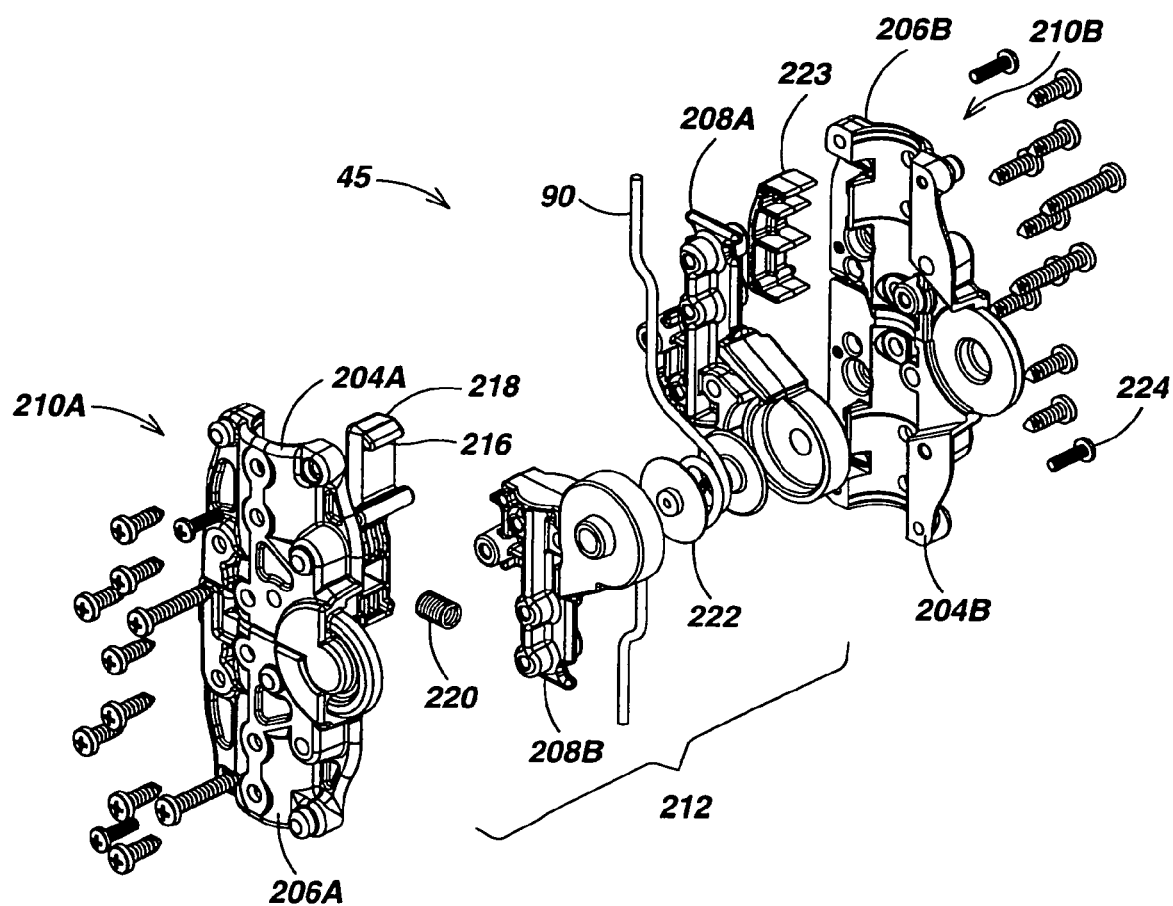
FIG. 13 is an exploded view illustrating the assembly of one pair of each of the three unique elements of FIGS. 12A-C to form the hollow hinge assembly of FIG. 11.

FIGS. 12A-C are perspective views of the two outer elements 204-206 and the one inner element 208 of the hollow hinge assembly 45. As described below, one outer element 204 may be engaged with one outer element 206 to provide a single moveably-engaged outer element pair 210 (FIG. 13). Similarly, two inner elements 208A-B may be disposed to produce a single moveably-engaged inner element pair 212 (FIG. 13). A catching surface 214 on inner element 208 is disposed to engage a mating surface 216 on the latch 218 to lock hollow hinge assembly 45 in the open position illustrated in FIGS. 1 and 11A. Hinge assembly 45 is self-latching when opened and must be manually released by depressing latch 218 (loaded with the spring 220) for closure into the closed position illustrated in FIGS. 2 and 11B. This approach has proven to be unexpectedly user-friendly.

FIG. 13 is an exploded view illustrating the assembly of one pair of outer elements 204A-B, one pair of outer elements 206A-B and one pair of inner elements 208A-B to form hollow hinge assembly 45 (FIGS. 11A-B). Outer element 204A is engaged with outer element 206A to form moveably-engaged outer element pair 210A. Similarly, outer element 206B is engaged with outer element 204B to form moveably-engaged outer element pair 210B. Finally, inner element 208A is disposed adjacent inner element 208B to provide moveably-engaged inner element pair 212. A harness cable bobbin 222 is disposed within the hollow portion of moveably-engaged inner element pair 212 to support and guide wire harness cable 90 and a covering insert 223 is disposed to cover the remaining gap between outer elements 204A and 206B substantially as shown in FIG. 13. Inner element pair 212 is mated to the inner sides of the two outer element pairs 210A-B and fastened with a plurality of threaded fasteners exemplified by the fastener 224.

Hollow hinge assembly 45 is simplified by eliminating any provision for latching in the closed position (FIGS. 2 and 11B); instead, elongated sensor assembly 21 is held closed by other useful means, such as, for example, a tube snap 226 mounted to lower sensor array housing 25C (FIG. 1). Alternatively, a similar snap may be provided to catch vertical member 44 to vertical member 42, for example, or another snap may be disposed at upper sensor array housing 25A for additional closure force. Alternatively, lower sensor array housing 25C may be snapped against the underside of housing assembly 40, for example.

The Ratcheting Audio User Interface

Figure 14A:
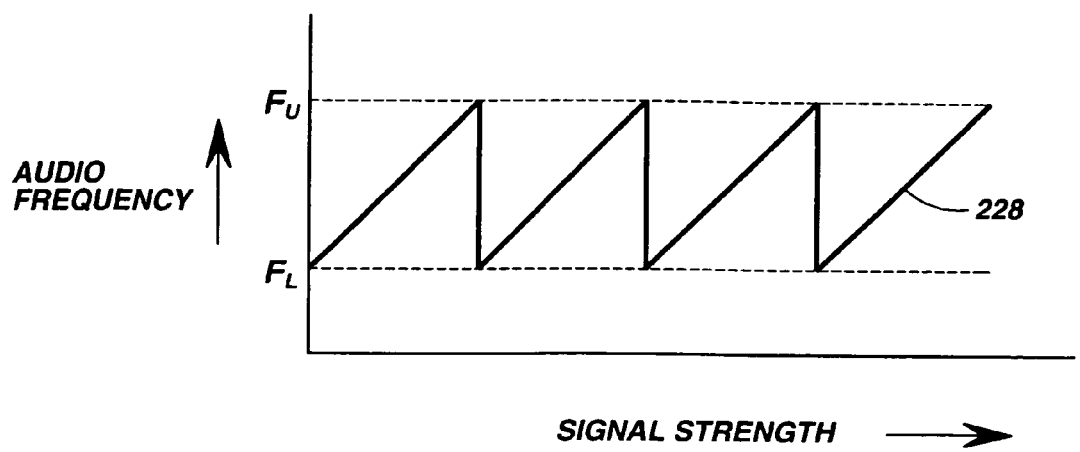
FIGS. 14A-B are graphical diagrams illustrating the audio frequency characteristics of the ratcheting audio UI (AUI) element of the locator system of this invention.
Figure 14B:
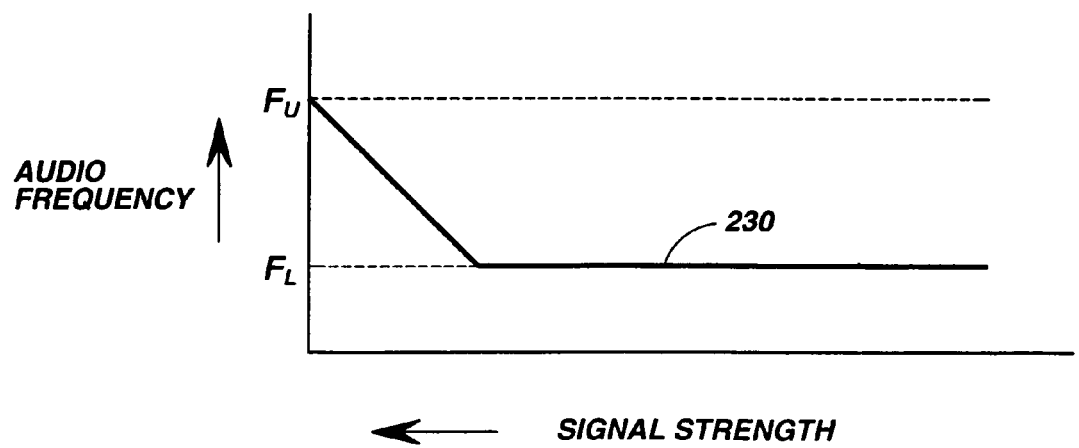

FIGS. 14A-B are graphical diagrams illustrating the audio frequency characteristics of the AUI ratcheting element of this invention, which may be embodied as an element of AUI 146 in combination with, for example, an appropriate software control element stored in internal memory 127 (FIG. 7). In FIG. 14A, the line 228 describes the audio frequency value within a frequency range $[F_L, F_U]$ on the vertical axis used by the ratcheting AUI element of this invention to indicate to the user an increasing signal strength corresponding to the charted value on the horizontal axis. Similarly, in FIG. 14B, the line 230 describes the audio frequency value within a frequency range $[F_L, F_U]$ on the vertical axis used by the ratcheting AUI element of this invention to indicate to the user a decreasing signal strength corresponding to the charted value on the horizontal axis. Thus, the AUI pitch ramps and "ratchets" continually in the upward direction and ramps and "sticks" at the lower limit in the downward direction. Signal strength as used herein denominates the amplitude of any useful buried object location indication selected by the user, such as virtual depth, for example.

This ratcheting locator system AUI was introduced by the inventors for the first time to improve the AUI dynamic range and has proven to be an unexpectedly advantageous improvement to usability over the earlier AUI described in the above-cited commonly-assigned patent applications incorporated herein. With increasing signal strength, the audio frequency (pitch) is ramped to a maximum frequency $F_U$ and abruptly (in a single step) dropped down to a minimum frequency $F_L$ and ramped again on a constant slope. The frequency range $[F_L, F_U]$ is selected by considering system limitations and standard human ear responses; for example, the inventors have found that a frequency range of $[F_L=400$ Hz, $F_U=2600$ Hz$]$ is advantageous where the "re-centered" hysteresis point is 464 Hz, for example. As a user moves closer to a buried signal emitter, the meaning of the ratcheting AUI action is generally quickly intuitive to most users. As a user moves away from the buried signal source however, the AUI frequency "sticks" to the lower limit $F_L$ as indicated by line 230 instead of abruptly jumping to the high frequency limit $F_H$ as would be indicated by line 228, which is strongly counterintuitive to many users. The inventors have found this "sticky" ratcheting AUI to be an unexpectedly advantageous and intuitive method for optimizing AUI sensitivity (dynamic range).

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

The invention claimed is:

1. A human-portable locator apparatus for locating a buried object characterized by an electromagnetic (EM) field emission, comprising:
    a housing;
    a sensor array connected to the housing including three substantially-identical EM field sensors each having at least one conductive coil with an outer side and an inner side disposed on a deformable annular wall having a radial centroid defining a sensing axis, said three EM field sensors each having a substantially identical longitudinal height dimension, a substantially identical radial thickness dimension, and a substantially identical circumference dimension;
    a structure for supporting the three substantially-identical EM field sensors such that the corresponding sensing axes are disposed in substantial mutual orthogonality and the corresponding conductive coils are disposed in substantial concentricity; and
    a circuit operatively coupled to the sensor array for detecting and reporting the EM field emission.

2. The locator apparatus of claim 1 and further comprising:
    in each EM field sensor, a flexible printed-circuit board (PCB) affixed to the deformable annular wall and including a signal contact pad conductively coupled to the conductive coil.

3. The locator apparatus of claim 2 and further comprising:
    in each EM field sensor, an electrostatic (ES) shield including a conductive layer disposed over the outer side of the conductive coil; and
    in the respective flexible PCB, a ground contact pad coupled to the ES shield.

4. The locator apparatus of claim 3 and further comprising:
    a signal conductor coupled between each of the PCB signal contact pads and the circuit, whereby sensor signals are transmitted from the sensor array to the circuit; and
    a ground conductor coupled between each of the PCB ground contact pads and an apparatus electrical ground, whereby the ES shields are maintained at ground potential.

5. The locator apparatus of claim 1 and further comprising:
    in each EM field sensor, an electrostatic (ES) shield including a conductive layer disposed over the outer side of the conductive coil.

6. A human-portable locator apparatus for locating a buried object characterized by an electromagnetic (EM) field emission, comprising:
    a housing;
    a sensor array connected to the housing including three substantially-identical EM field sensors each having at least one conductive coil with an outer side and an inner side disposed on a deformable annular wall defining a sensing axis, and a flexible printed-circuit board (PCB) affixed to the deformable annular wall and including a signal contact pad conductively coupled to the conductive coil;
    a structure for supporting the three substantially-identical EM field sensors such that the corresponding sensing axes are disposed in substantial mutual orthogonality and the corresponding conductive coils are disposed in substantial concentricity; and a circuit operatively coupled to the sensor array for detecting and reporting the EM field emission.

7. The locator apparatus of claim 6 and further comprising:
in each EM field sensor, an electrostatic (ES) shield including a conductive layer disposed over the outer side of the conductive coil; and
in the respective flexible PCB, a ground contact pad coupled to the ES shield.

8. The locator apparatus of claim 7 and further comprising:
a signal conductor coupled between each of the PCB signal contact pads and the circuit, whereby sensor signals are transmitted from the sensor array to the circuit; and
a ground conductor coupled between each of the PCB ground contact pads and an apparatus electrical ground, whereby the ES shields are maintained at ground potential.

9. The locator apparatus of claim 6 and further comprising:
in each EM field sensor, an electrostatic (ES) shield including a conductive layer disposed over the outer side of the conductive coil.

10. A human-portable locator apparatus for locating a buried object characterized by an electromagnetic (EM) field emission, comprising:
a housing;
a sensor array connected to the housing including three substantially-identical EM field sensors each having at least one conductive coil with an outer side and an inner side disposed on a deformable annular wall defining a sensing axis, and in each EM field sensor, an electrostatic (ES) shield including a conductive layer disposed over the outer side of the conductive coil;
a structure for supporting the three substantially-identical EM field sensors such that the corresponding sensing axes are disposed in substantial mutual orthogonality and the corresponding conductive coils are disposed in substantial concentricity; and
a circuit operatively coupled to the sensor array for detecting and reporting the EM field emission.

11. The locator apparatus of claim 10 and further comprising:
in each EM field sensor, a flexible printed-circuit board (PCB) affixed to the deformable annular wall and including a signal contact pad conductively coupled to the conductive coil.

12. The locator apparatus of claim 11 and further comprising:
in the respective flexible PCB, a ground contact pad coupled to the electrostatic (ES) shield.

13. The locator apparatus of claim 11 and further comprising:
a signal conductor coupled between each of the PCB signal contact pads and the circuit, whereby sensor signals are transmitted from the sensor array to the circuit; and
a ground conductor coupled between each of the PCB ground contact pads and an apparatus electrical ground, whereby the electrostatic (ES) shields are maintained at ground potential.

* * * * *